United States Patent
Mabuchi et al.

(10) Patent No.: US 8,547,453 B2
(45) Date of Patent: Oct. 1, 2013

(54) IMAGE PROCESSING APPARATUS AND CAMERA SYSTEM

(75) Inventors: Ken Mabuchi, Kanagawa (JP); Kazunori Yamaguchi, Tokyo (JP)

(73) Assignee: Sony Corporation, Tokyo (JP)

(*) Notice: Subject to any disclaimer, the term of this patent is extended or adjusted under 35 U.S.C. 154(b) by 499 days.

(21) Appl. No.: 12/098,761

(22) Filed: Apr. 7, 2008

(65) Prior Publication Data

US 2008/0266422 A1 Oct. 30, 2008

(30) Foreign Application Priority Data

Apr. 25, 2007 (JP) ................................. 2007-115499

(51) Int. Cl.
*H04N 5/76* (2006.01)
*G06F 9/26* (2006.01)

(52) U.S. Cl.
USPC .................... 348/231.9; 348/231.99; 711/207

(58) Field of Classification Search
USPC .............. 348/231.1–231.9, 231.99; 711/148, 711/149, 202, 206–208; 386/46, 125; 370/260, 370/269
See application file for complete search history.

(56) References Cited

U.S. PATENT DOCUMENTS

| | | | | |
|---|---|---|---|---|
| 5,761,726 A | * | 6/1998 | Guttag et al. | 711/147 |
| 6,119,204 A | * | 9/2000 | Chang et al. | 711/141 |
| 6,430,666 B1 | * | 8/2002 | Roth | 711/202 |

FOREIGN PATENT DOCUMENTS

| | | |
|---|---|---|
| JP | 62-137669 | 6/1987 |
| JP | 63-36381 | 2/1988 |
| JP | 7-93210 | 4/1995 |
| JP | 3139084 | 12/2000 |
| JP | 2001-57634 | 2/2001 |
| JP | 2002-300385 | 10/2002 |
| JP | 2003-316646 | 11/2003 |

* cited by examiner

*Primary Examiner* — Tuan Ho
*Assistant Examiner* — Akshay Trehan
(74) *Attorney, Agent, or Firm* — Oblon, Spivak, McClelland, Maier & Neustadt, L.L.P.

(57) ABSTRACT

An image processing apparatus includes a plurality of video processors, a video memory for recording video data, and a plurality of ports. Each of the ports is connected between the video processor and the video memory, for accessing the video memory in response to supplied information. A plurality of memory map table units, each includes at least one table for being set with management information for managing a memory area of the video memory in which video data is recorded, for selectively supplying the management information set to the table to corresponding ports. A processing unit has a function of setting the management information to the table of the memory map table unit.

11 Claims, 23 Drawing Sheets

IMAGE PROCESSING APPARATUS AND CAMERA SYSTEM

BACKGROUND OF THE INVENTION

1. Field of the Invention

The present invention relates to an image processing apparatus and camera system applicable to a digital camera and the like, and more particularly to management technologies for a video memory.

2. Description of Related Art

FIG. 1 is a block diagram showing an example of the structure of a video signal processing apparatus incorporating typical video memory management technologies and being applicable to a digital camera and the like.

The image processing apparatus 100 shown in FIG. 1 has: a plurality of video processors 101-1 to 101-$m$ (in the example shown in FIG. 1, m=4); a video memory (also called a temporary video memory in some cases) 102 used as a shared memory for temporarily recording images; a video bus 103 used for accessing the video memory 102; a plurality of ports 104-1 to 104-4 for data processing such as compression and calculation and for data conversion for accessing the video bus 103; a central processing unit (CPU) 105 for performing various settings to each port 104-1 to 104-4 such as arrangement and attribute information on video data, control information and the like; a local bus 106 for data transfer between CPU 105 and each port 104-1 to 104-4; and image processing data buses 107-1 to 107-4 for transferring image processing data from each video processor 101-1 to 101-4 to a corresponding one of the ports 104-1 to 104-4.

Each port 104-1 to 104-4 has a read port and a write port.

In the structure of the image processing apparatus 100, CPU 105 sets arrangement information on video data in the video memory 102 and a control signal to each port 104-1 to 104-4 to transfer data between each video processor 101-1 to 101-4 connected to each port 104-1 to 104-4 and the temporary video memory 102 connected to the video bus 103.

FIG. 2 is a flow chart showing the outline of a read/write process of the image processing apparatus 100 shown in FIG. 1.

In the image processing apparatus 100, CPU 105 sets arrangement and attribute information on video data in the temporary video memory 102 and control information to each port 104-1 to 104-4. Each video processor 101-1 to 101-4 sends a data control signal to the ports 104-1 to 104-4 to perform data transfer between each video processor and the temporary video memory 102.

If the arrangement and attribute information on video data in the temporary video memory 102 or the control information for each port 104-1 to 104-4 is required to be changed, each video processor 101-1 to 101-4 issues an interrupt to CPU 105, and after an address and a control signal set to each port 104-1 to 104-4 are changed, a data control signal is transferred to each port 104-1 to 104-4.

Then, as shown in FIG. 2, CPU 105 judges whether a port is a read port or not (ST1), and if it is judged that the port is the read port, a read address of the video memory 102 is set to the read port of the port 104 (-1 to -4) via the local bus 106 (ST2).

Next, the read port executes a read transaction via the video bus 103 (ST3).

Data read from the video memory 102 by the read transaction is received at the read port (ST4).

Next, the read data received at the read port is output to the video processor 101 (-1 to -4) (ST5).

If CPU 105 judges at Step ST1 that the port is not the read port but the write port, a write address of the video memory 102 is set to the write port of the port 104 (-1 to -4) via the local bus 106 (ST6).

The corresponding video processor 101 (-1 to -4) outputs data to be written in the video memory 102 to the write port (ST7).

The write port executes a write transaction via the video bus 103 to write data received from the video processor 101 (-1 to -4) in the video memory 102 (ST8).

A variety of memory management technologies for an image processing apparatus have been proposed (e.g., refer to Japanese Patent Application Publications No. HEI-7-93210, Patent Document 1, and No. 2003-316646, Patent Document 2).

Patent Document 1 discloses a shared memory management scheme in which in response to a request from a plurality of processes, a page table converts a physical address into a logical address to improve a memory usage efficiency.

Japanese Patent Unexamined Publication No. 2003-316646 discloses a memory management scheme in which a virtual memory is managed on a page unit basis for a plurality of processes to improve a memory usage efficiency.

SUMMARY OF THE INVENTION

Recent specifications required for a typical digital still camera include the improvement on a frame rate, i.e., both of speeding up image processing, and image processings of a plurality of types.

However, as in the technologies, a memory management apparatus, in which a central processing unit (CPU) controls a change in arrangement and attribute information on video data for data read/write of a temporary video memory and switching of control information on each port, is associated with critical problems of memory map switching for image processing flows of a plurality of types and a memory usage efficiency of the temporary video memory.

Although a typical CPU can execute versatile processes, the process performance is likely to become insufficient for an apparatus which requires high speed flow control, such as a digital still camera having a limit of an operation frequency, and is changed by the influence of other processings. It is therefore difficult to guarantee the minimum performance.

Namely, if image processings of a plurality of types are executed in the same system, this increases the number of times for changing the arrangement and attribute information on video data or control information on a port.

In the system, each time such a change is made, it is necessary to issue an interruption to CPU and make CPU change settings of the port via the local bus. This may cause inability of high speed memory map switching for a plurality of system operations, and a degraded memory usage efficiency, in a digital still camera required to be compatible with a high frame rate and to execute high speed processings by a mixed plurality types of image processing flows.

From this reason, with the address management via CPU in the technologies, it is difficult to change to high speed when it is required to change the arrangement and attribute information on video data for data read/write from the temporary video memory, and whereby the processing speed and memory usage efficiency may be lowered considerably.

This is fatal in an apparatus required to perform concurrent image processings of a plurality of types, such as a digital still camera.

According to embodiments of the present invention, there are provided an image processing apparatus and a camera system capable of performing high speed controlled switching of a signal required to be switched and improving a processing speed and a memory usage efficiency.

According to a first aspect of the present invention, there is provided an image processing apparatus includes a plurality of video processors, a video memory for recording video data, a plurality of ports, each connected between the video processor and the video memory, for accessing the video memory based on supplied information, a plurality of memory map table units, each including at least one table for being set with management information for managing a memory area of the video memory in which memory area video data is recorded, the memory map table units selectively supplying the management information set to the table to a corresponding one of the ports, and a processing unit having a function of setting the management information to the table of the memory map table unit.

According to a second aspect of the present invention, there is provided a camera system including an image-capture device for taking an image of an object and outputting video data and an image processing apparatus for performing predetermined processing on the video data. The image processing apparatus includes a plurality of video processors, a video memory for recording video data; a plurality of ports, each connected between the video processor and the video memory, for accessing the video memory based on supplied information, a plurality of memory map table units, each including at least one table for being set with management information for managing a memory area of the video memory in which memory area video data is recorded, the memory map table units selectively supplying the management information set to the table to a corresponding port, and a processing unit having a function of setting the management information to the table of the memory map table unit.

Preferably, there are further provided a plurality of port controllers each for controlling a supply of the management information set to the table of the memory map table units to a corresponding port.

Preferably, the management information set to the table includes address information and control information on the port. The port controller outputs a pointer to the memory map table unit, the pointer selecting a pair of address information and control information in the table in accordance with a timing signal and data set to a register. The memory map table unit outputs a pair of address information and control information corresponding to the pointer supplied from the port controller.

Preferably, a plurality of port controllers per one port are provided.

Preferably, the management information set to the table includes address information and control information on the port. The port controller outputs a plurality of pointers to the memory map table unit, the pointer selecting a pair of address information and control information in the table in accordance with a timing signal and data set to a register. The memory map table unit dynamically selects a plurality of pointers supplied from the port by operation mode signal, and outputs a pair of address information and control information corresponding to the selected pointer.

Preferably, the management information set to the table includes arrangement and attribute information on the video data and control information on the port.

According to embodiments of the present invention, a memory map of the video memory is switched at high speed by using the page table of the memory map table unit.

According to embodiments of the present invention, it is possible to perform high speed switching control for a signal required to be switched and whereby a processing speed and a memory usage efficiency may be improved.

BRIEF DESCRIPTION OF THE DRAWINGS

FIG. 1 is a block diagram showing an example of the structure of a video signal processing apparatus incorporating typical video memory management technologies applicable to a digital camera or the like;

DETAILED DESCRIPTION OF THE EMBODIMENTS

Embodiments of the present invention will now be described with reference to the accompanying drawings.

First Embodiment

Figure 1:
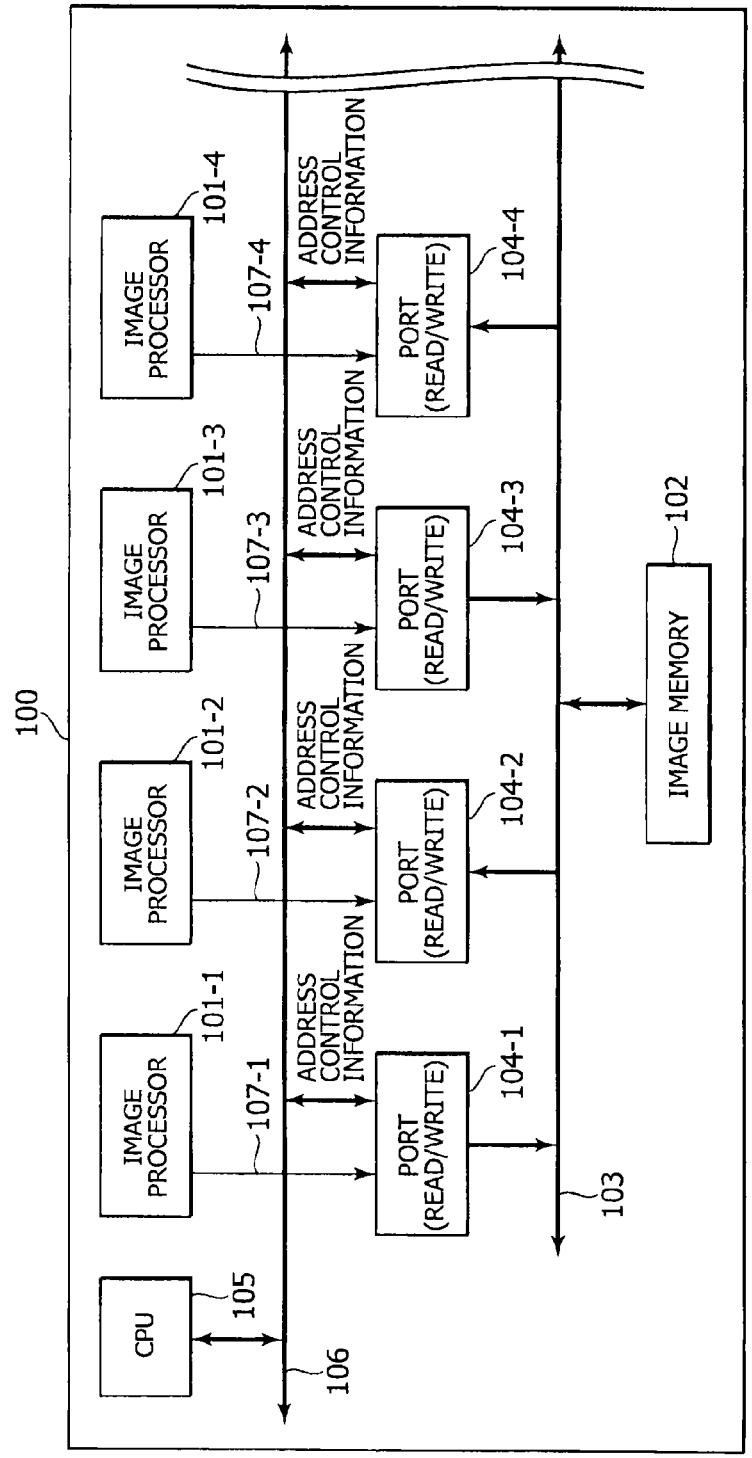
Figure 2:
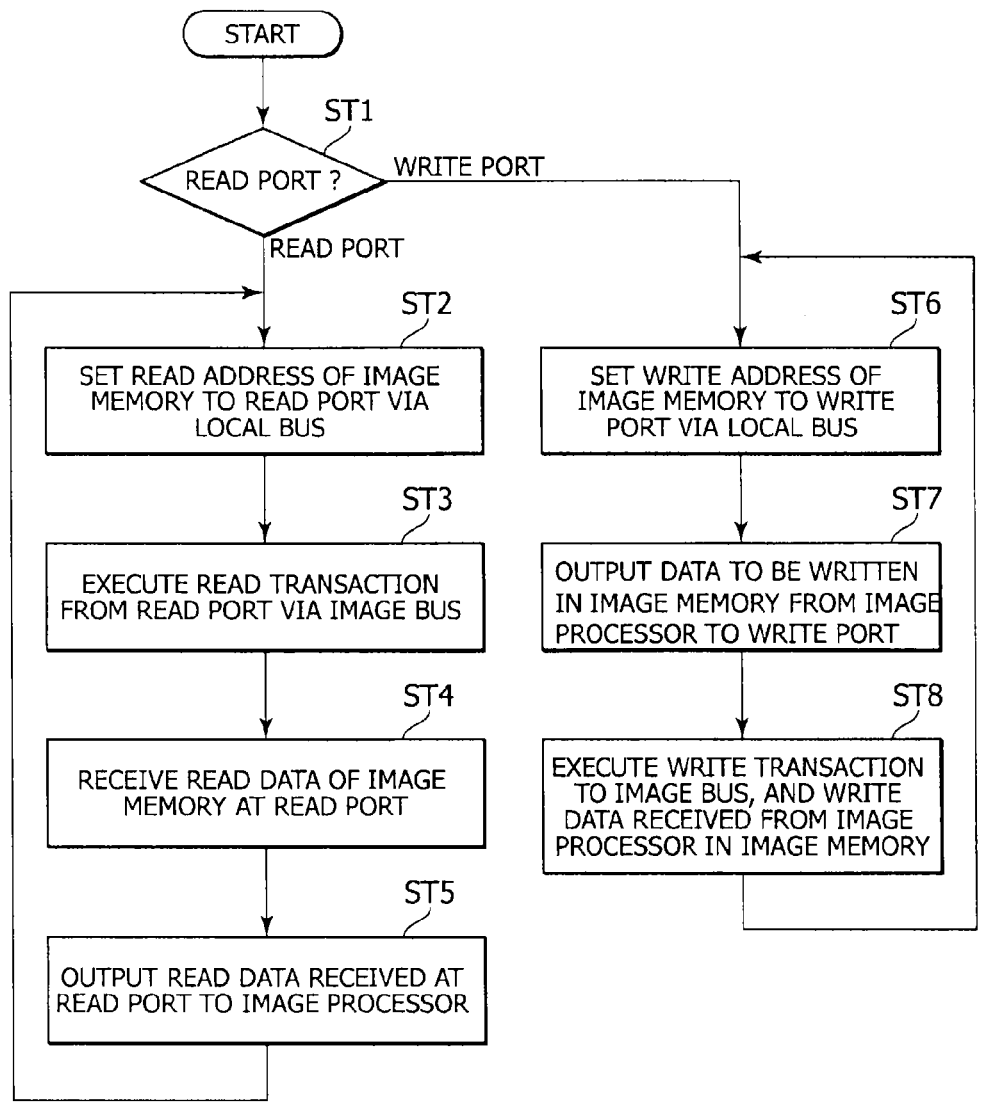
FIG. 2 is a flow chart illustrating the outline of a read/write process of the image processing apparatus shown in FIG. 1.
Figure 3:
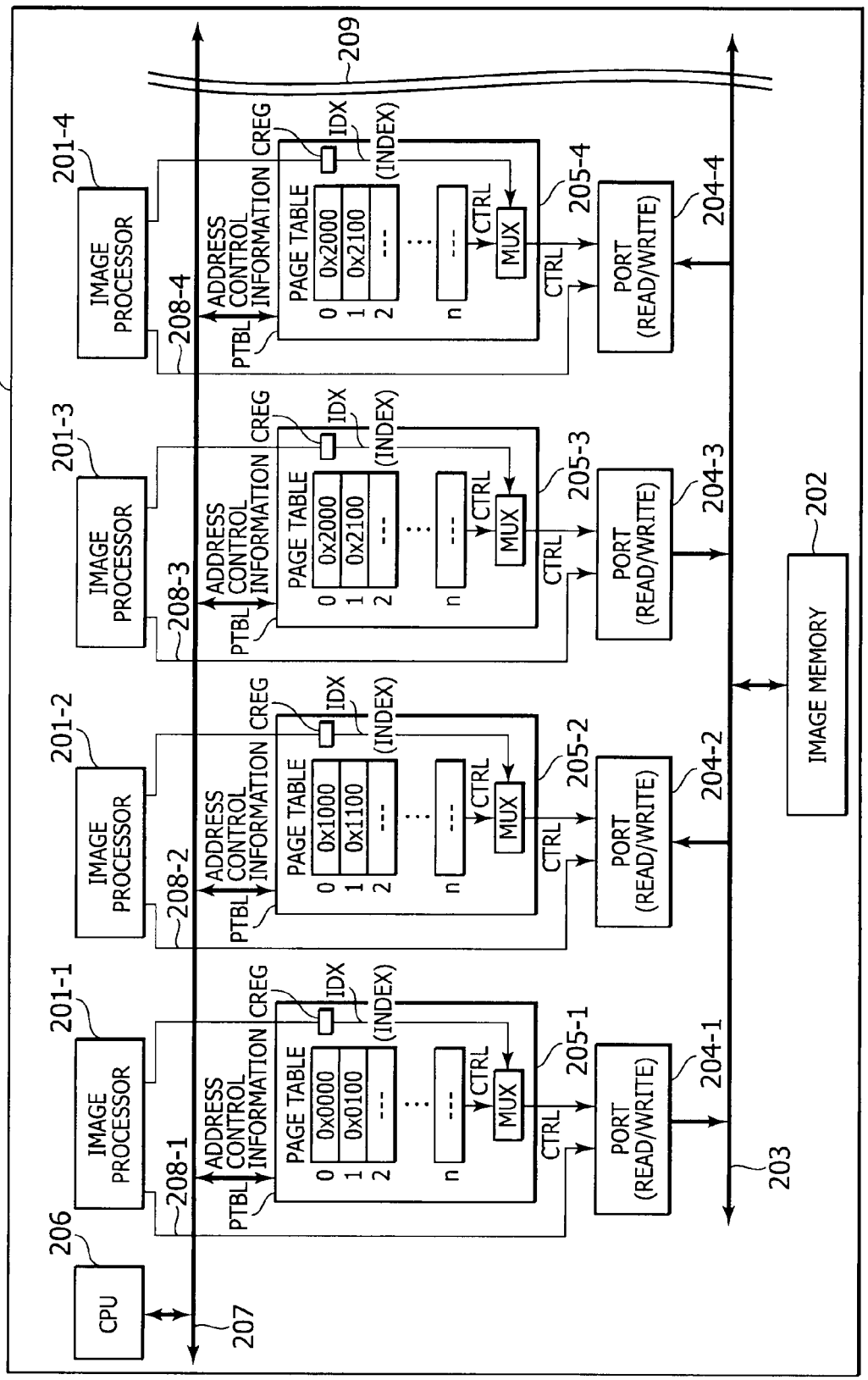
FIG. 3 is a block diagram showing an example of the structure of an image processing apparatus according to a first embodiment of the present invention.

FIG. 3 is a block diagram showing an example of the structure of an image processing apparatus according to the first embodiment of the present invention.

The image processing apparatus 200 shown in FIG. 3 has a plurality of video processors 201-1 to 201-*m* (in the example shown in FIG. 3, m=4), a video memory (also called a memory, a temporary video memory in some cases) 202 used as a shared memory for temporarily recording images, a video bus 203 used for accessing the video memory 202, a plurality of ports 204-1 to 204-*m* for data processing such as compression and calculation and for data conversion for accessing the video bus 203 (in the example shown in FIG. 3, m=4); memory map table units 205-1 to 205-*m* (in the example shown in FIG. 3, m=4) each having a page table PTBL holding arrangement and attribute information on image data to read/write data from the video memory 202 and control information on each port 204-1 to 204-4, a central processing unit (CPU) 206 for performing various settings, such as video data arrangement, attribute information, control information and the like to the page table PTBL contained in memory map table unit 205-1 to 205-4, a local bus 207 for data transfer between CPU 206 and each memory map table unit 205-1 to 205-4, image processing data buses 208-1 to 208-*m* (in the example shown in FIG. 3, m=4) for transferring image processing data from each video processor 201-1 to 201-4 to a corresponding one of the ports 204-1 to 204-4, and a main bus 209 for signal transfer between each video processor 201-1 to 201-4 and the video bus 203 and local bus 207.

Each port 204-1 to 204-4 is constituted of a read port and a write port.

As shown in FIG. 3, each memory map table unit 205 (-1 to -4) has the page table PTBL holding arrangement and attribute information on image data to read/write data from the video memory 202 and control information CTRL on each port 204-1 to 204-4, a multiplexer MUX for selecting information held in the page table PTBL in response to an index signal IDX and outputting the selected information to a corresponding port 204 (-1 to -4), and a control register CREG to which information on the index signal IDX is set.

Index information may be set to the control register CREG from CPU 206 via the local bs 207, or from a corresponding video processor 201 (-1 to -4).

By adding an image size as control information (signal) for image processing, a shift from two-dimensional rectangle data to one-dimensional continuous data can be controlled per each input/output port.

By adding image format information, pack/unpack of pixel data can be controlled per each input/output port.

By adding processing information, data compression/expansion, folding and the like can be controlled per each input/output port.

By adding transfer method information, bus traffic can be controlled per each input/output port.

In the first embodiment, by providing the memory map table unit 205 (-1 to -4) having the page table PTBL, it becomes possible to improve the memory map management for image processing flows of a plurality of types and a memory usage efficiency of the temporary memory 202.

Description will be made by comparing the memory management process with a page table and without a page table.

Figure 4:
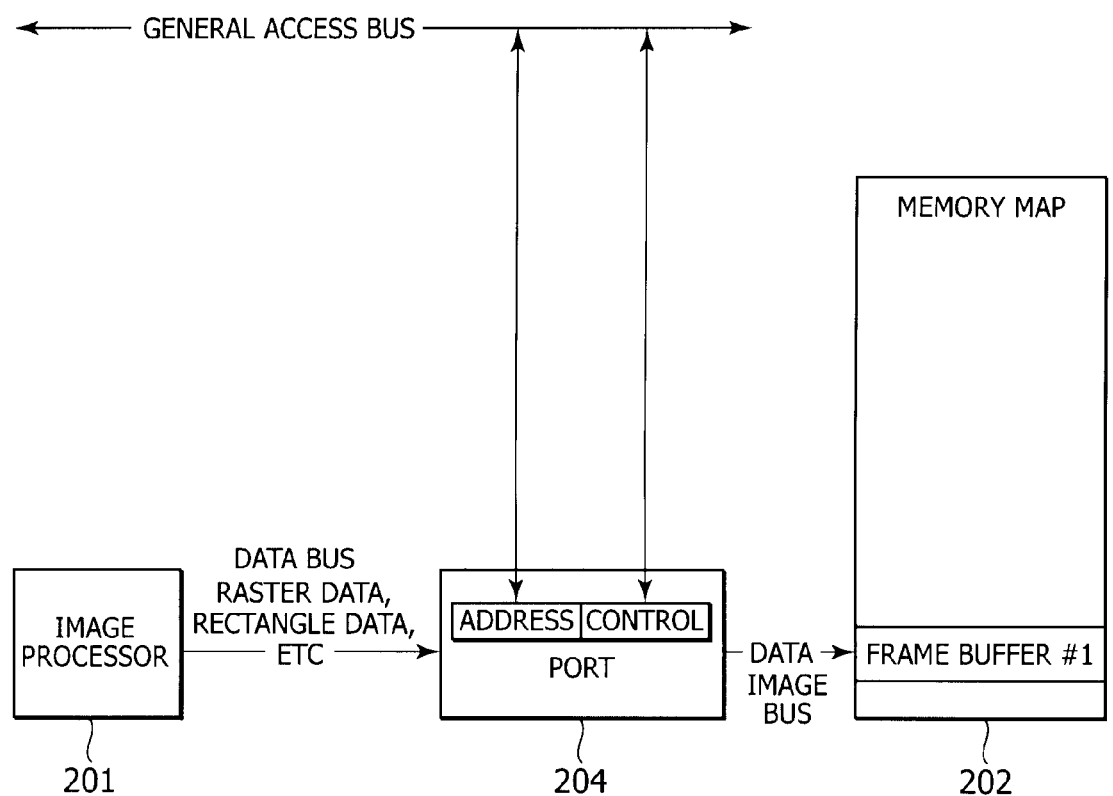
FIG. 4 is a diagram illustrating a memory management process without a page table.
Figure 5:
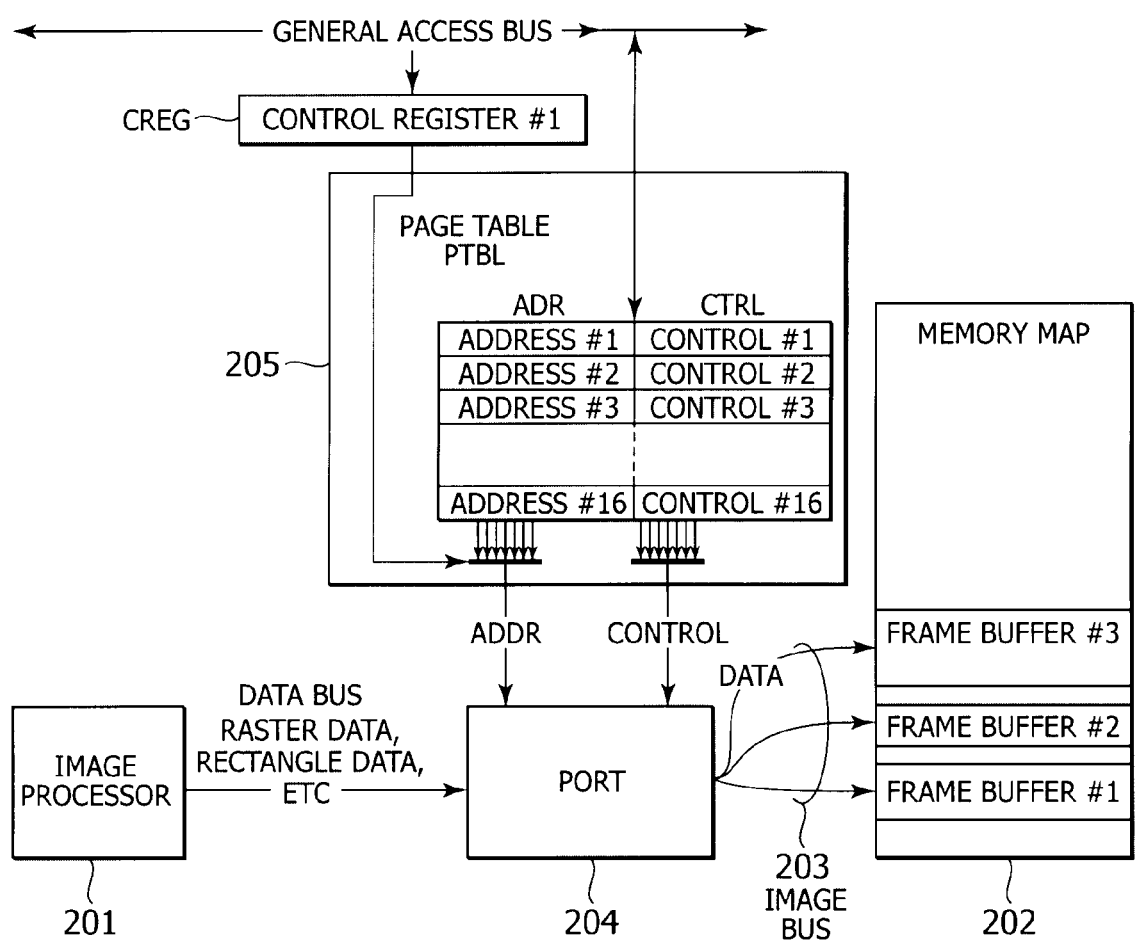
FIG. 5 is a diagram illustrating a memory management process with a page table.

FIG. 4 is a diagram illustrating the memory management process without a page table, and FIG. 5 is a diagram illustrating the memory management process with a page table.

[Without Page Table]

As shown in FIG. 4, if the page table is not provided, control information on each port 204 (-1 to -4) is distributed to each port. With software control, settings are required to be changed at timing each time a system operation mode is switched.

This distributed software control may have a difficulty of control, in particular, real time system control.

[With Page Table]

FIG. 5 illustrates the case in which the page table is connected to each port. In the structure of this case, the control register CREG selects a plurality of pairs of address information ADR and control information CTRL set to page table PTBL in advance, and address information ADR and control information CTRL are transmitted to the port 204 (-1 to -4).

The page table PTBL may have two control registers CREG for two or more ports to distribute different address information and control information to each port.

As described above, if the ports 204 (-1 to -4) output a plurality of pieces of video data depending upon a system operation mode, it is necessary to switch quickly the address information ADR and control information CTRL. If there are a plurality of connections between the ports and page tables as described above, it is necessary to collectively manage a plurality of page tables.

In such a case, it becomes possible to switch at once an address of a memory map of video data to be read/written by a plurality of video processors.

In the image processing apparatus 200 structured as above, CPU 206 sets video data arrangement information and control information (signals) to the page table PTBL provided in each memory map table unit 205-1 to 205-4. Further, CPU 206 (or video processor 201 (-1 to -4)) transfers an index signal IDX for selecting the page table PTBL to the control register CREG of the memory map table unit 205 (-1 to -4), and data and a control signal to the port 204 (-1 to -4).

In this structure, upon reception of various signals from the video processor 201 (-1 to -4) and memory map table unit 205 (-1 to -4), the port 204 (-1 to -4) performs data transfer with the temporary video memory connected to the video bus 203.

When image processings of different types stored in the page table PTBL are executed, switching can be realized easily by switching the page table select index signal IDX to be supplied from CPU 206 or video processor 201.

An image memory management apparatus which can manage the memory map for image processing flows of a plurality of types and improve a usage efficiency of the temporary video memory can thus be realized.

Figure 6:
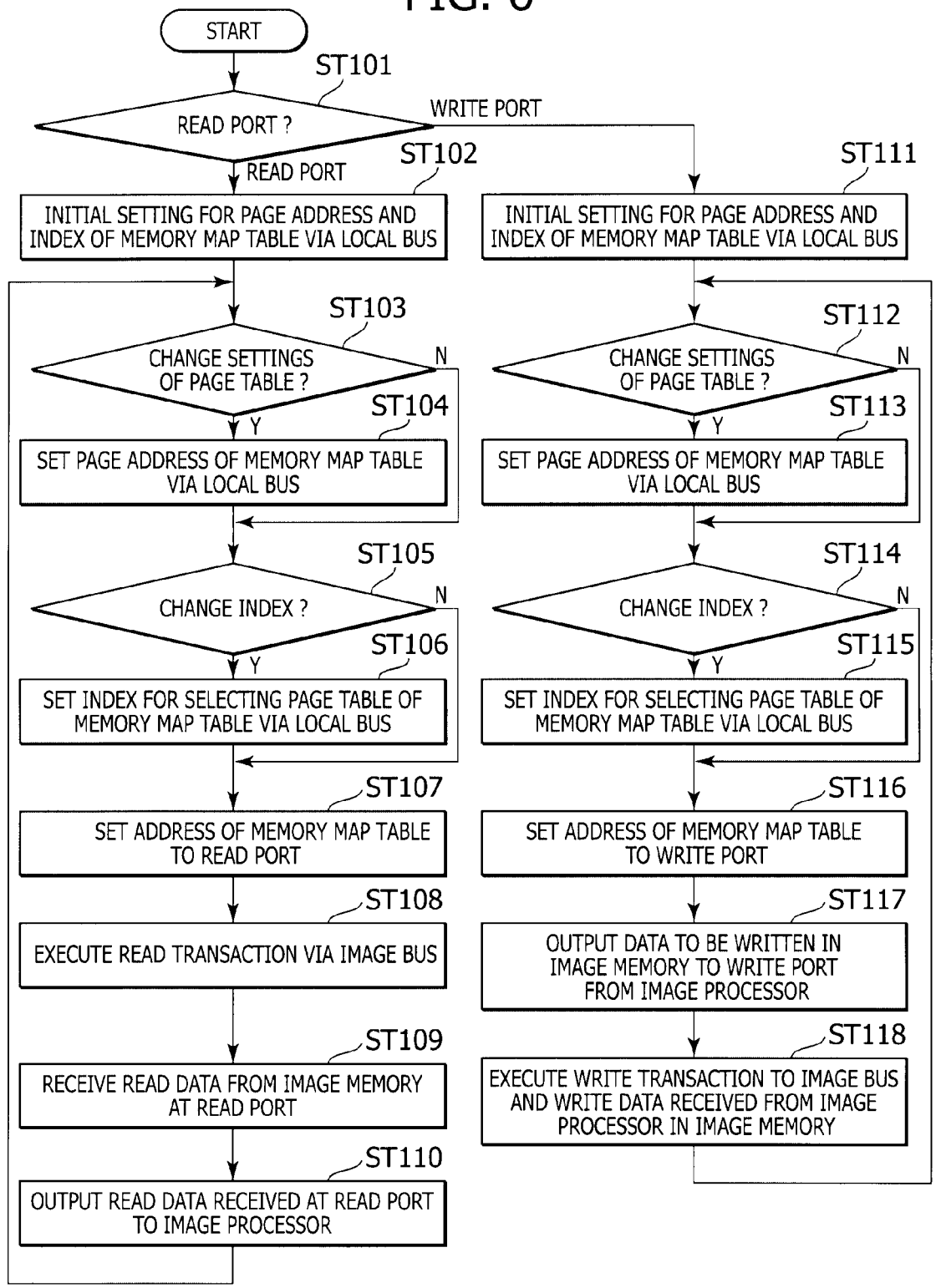
FIG. 6 is a flow chart illustrating the outline of a read/write process of the image processing apparatus shown in FIG. 3.

FIG. 6 is a flow chart illustrating the outline of a read/write process of the image processing apparatus 200 shown in FIG. 3.

Description will now be made on the read/write process of the image processing apparatus 200 shown in FIG. 3, with reference to FIG. 6.

As shown in FIG. 6, CPU 206 judges whether a port is a read port or a write port (ST101), and if it is judged that the port is the read port, a page address and an index of the memory map table unit 205 (-1 to -4) are initialized via the local bus 207 (ST102).

Next, it is judged whether settings of the page table PTBL are required to be changed (ST103), and if it is necessary to change, a page address is set to the page table PTBL of the memory map table 205 (-1 to -4) via the local bus 207 (ST104) to advance to the process at Step ST105. If it is judged at Step ST103 that settings change of the page table PTBL are not necessary, the process at Step ST104 is not performed and the flow advances to the process at Step ST105.

It is judged at Step ST105 whether the index is required to be changed or not, and if it is necessary to change, the index for selecting the page table PTBL of the memory map table unit 205 (-1 to -4) is set to the control register CREG via the local bus 207 (ST106) and then the flow advances to the process at Step ST107. If it is judged at Step ST105 that the index change is not necessary, the process at Step ST106 is not performed and the flow advances to the process at Step ST107.

At Step ST107, the read address of the video memory 202 selected in accordance with the index in the memory map table unit 205 (-1 to -4) is set to the read port of the corresponding port 204 (-1 to -4).

Next, the read port executes a read transaction to the video bus 203 (ST108).

Data read from the video memory 202 upon the read transaction is received at the read port (ST109).

Next, the read data received at the read port is output to the corresponding video processor 201 (-1 to -4) (ST110).

If CPU 206 judges at Step ST101 that a port is not a read port but a write port, a page address and an index of the memory map table unit 205 (-1 to -4) are initialized via the local bus 207 (ST111).

Next, it is judged whether setting change of the page table PTBL are required or not (ST112), and if it is necessary to change, a page address is set to the page table PTBL of the memory map table unit 205 (-1 to -4) via the local bus 207 (ST113) and the flow advances to the process at Step ST114. If it is judged at Step ST112 that setting change of the page table PTBL are not required, the process at Step ST113 is not performed and the flow advances to the process at Step ST114.

It is judged at Step ST114 whether the index change is required or not, and if it is necessary to change, the index for selecting the page table PTBL of the memory map table unit 205 (-1 to -4) is set via the local bus 207 (ST115) and the flow advances to the process at Step ST116. If it is judged at Step ST114 that the index change is not required, the process at Step ST115 is not performed and the flow advances to the process at Step ST116.

At Step ST116, the write address of the video memory 202 selected in accordance with the index in the memory map table unit 205 (-1 to -4) is set to the write port of the corresponding port 204 (-1 to -4).

Next, the corresponding video processor 201 (-1 to -4) outputs data, which should be written in the video memory 202, to the write port (ST117).

The write port executes a write transaction via the video bus 203 to write the data received from the video processor 201 (-1 to -4) in the video memory 202 (ST118).

Figure 7:
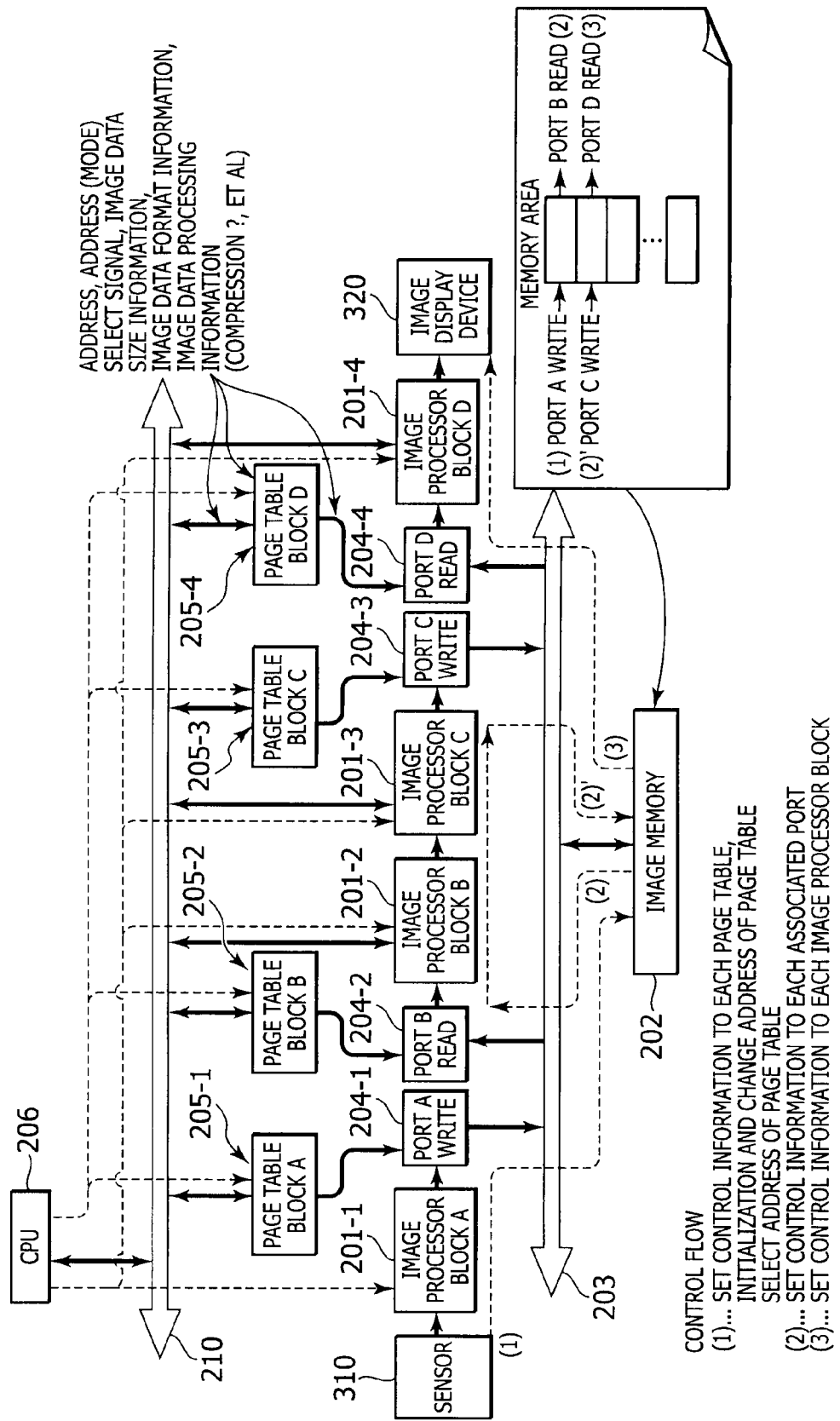
FIG. 7 is a diagram showing the overall flow of address, control information and data in the image processing apparatus of the first embodiment.
Figure 8:
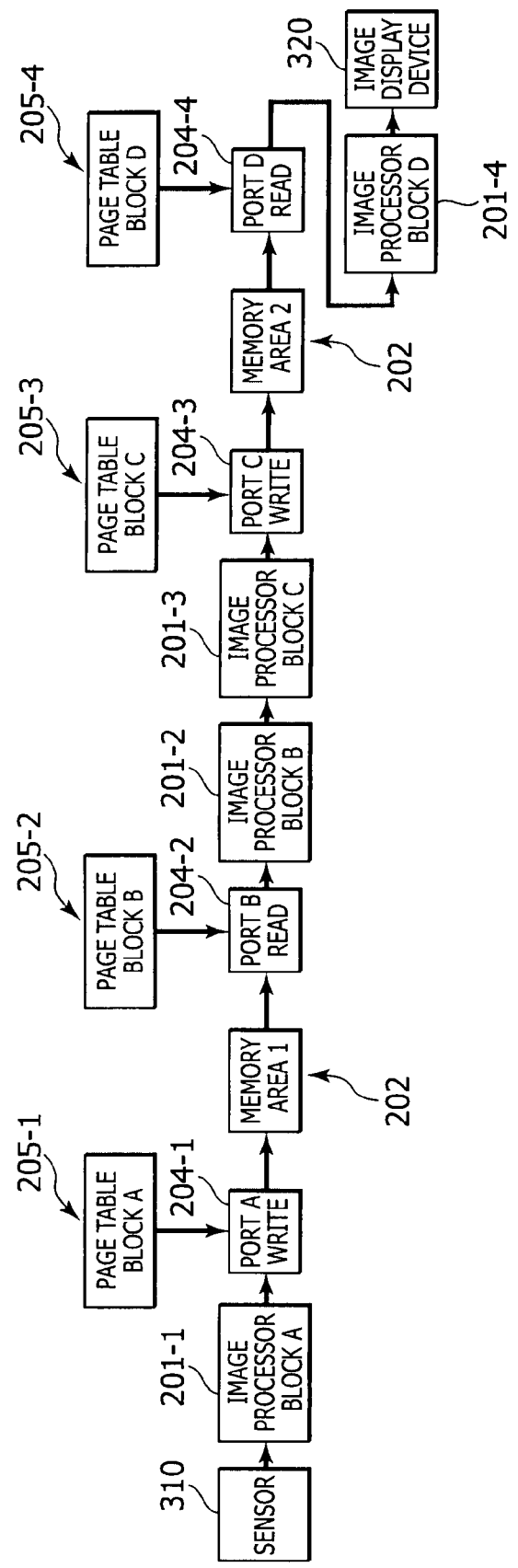
FIG. 8 is a diagram showing data input constituent elements of the image processing apparatus in the first embodiment, by time sequence along a data flow.
Figure 9:
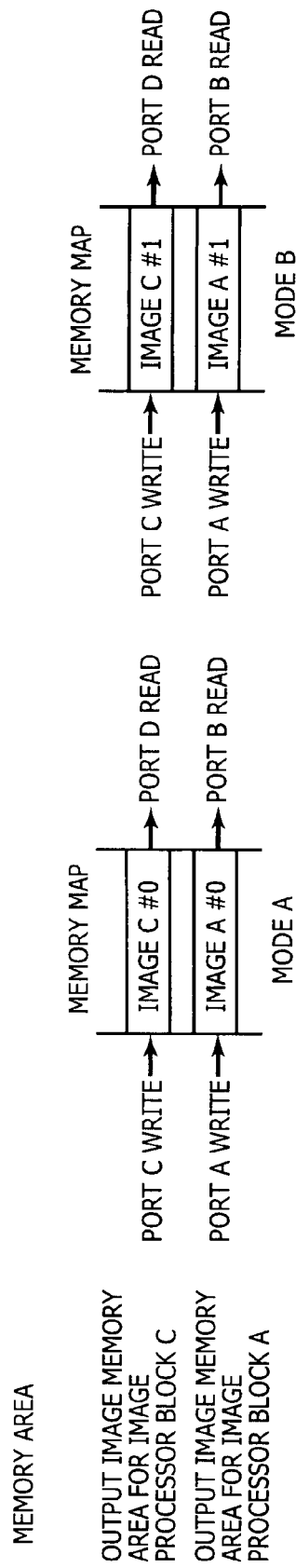
FIG. 9 is a diagram showing an example of a memory area of the first embodiment.

FIGS. 7, 8 and 9 show the flow of address, control information and data in the image processing apparatus controlled in the manner described above to perform image processings of different types through repetition of read/write, and an example of a memory map in the memory area of the video memory 202.

FIG. 7 is a diagram showing the overall flow of address, control information and data in the image processing apparatus of the first embodiment. FIG. 8 is a diagram showing input data constituent elements of the image processing apparatus of the first embodiment by time sequence along a data input flow. FIG. 9 is a diagram showing an example of a memory area of the first embodiment.

In this example, video data taken by a sensor 310 having a solid state image pickup device such as a CCD and a CMOS sensor is displayed on an output device such as a video display device 320.

In FIGS. 7 and 8, the video processor 201-1 shown in FIG. 3 is represented as a video processor block A, the video processor 201-2 is represented as a video processor block B, the video processor 201-3 is represented as a video processor block C, and the video processor 201-4 is represented as a video processor block D.

Similarly, the page table PTBL of the memory map table 205-1 shown in FIG. 3 is represented as a page table block A, the page table PTBL of the memory map table 205-2 is represented as a page table block B, the page table PTBL of the memory map table 205-3 is represented as a page table block C, and the page table PTBL of the memory map table 205-4 is represented as a page table block D.

The port 204-1 shown in FIG. 3 is represented as a port A, the port 204-2 is represented as a port B, the port 204-3 is represented as a port C, and the port 204-4 is represented as a port D.

In FIG. 7, a control bus 210 includes the local bus 207 and main bus 209 shown in FIG. 3.

In this arrangement, for example, CPU 206 sets an address and control information to each page table PTBL and video processors (blocks) 201-1 to 201-4.

As described with reference to FIG. 6, after it is judged whether the port to be used is a read port or a write port of the corresponding port 204-1 to 204-4, the address of the page table PTBL is initialized, changed and so on and the address and control information of the page table PTBL are selected in accordance with the index.

The control information is set to the corresponding port 204-1 to 204-4.

The control information is set to the video processors (blocks) 201-1 to 201-4.

The control information includes image size information, image format information, image processing information such as compression and expansion, and other information.

In the example shown in FIGS. 7 to 9, the port 204-1 uses the write port, the port 204-2 uses the read port, the port 204-3 uses the write port, and the port 204-4 uses the read port.

Time sequential description will be made on the process to be executed by the image processing apparatus 200 under the control described above. First, video data taken by the sensor 310 and converted from analog to digital is inputted to the video processor 201-1. The video-processor 201-1 processes (e.g., compresses) video data in response to the set control information. The processed video data is stored in a memory area 1 of the video memory 202 via the video bus 203 in accordance with a write transaction of the write port of the port 204-1.

Next, the compressed video data recorded in the memory area 1 of the video memory 202 is read in response to a read transaction of the read port of the port 204-2, and transferred to the video processor 201-2. The video processor 201-2 executes an expansion (development) process or decode process for the read data, and transfers the results to the video processor 201-3.

The video processor 201-3 executes an encode process, e.g., generating a video source through a compression signal process of the video data, and the results are stored in a memory area 2 of the video memory 202 via the video bus 203 in response to a write transaction of the write port of the port 204-3.

Next, the compressed video data recorded in the memory area 2 of the video memory 202 is read in response to a read transaction of the read port of the port 204-4, and transferred to the video processor 201-4. The video processor 201-4 processes the read data by an expansion (development) process or decode process and image processing compliant with the display apparatus, and transfers the results to the video display apparatus 320.

As described above, according to the first embodiment, by using the page table provided in the memory map table unit and a corresponding page index, it becomes possible to manage the memory map of the temporary video memory for the image processing flows of a plurality of types, and to improve a memory usage efficiency of the temporary video memory.

Second Embodiment

Figure 10:
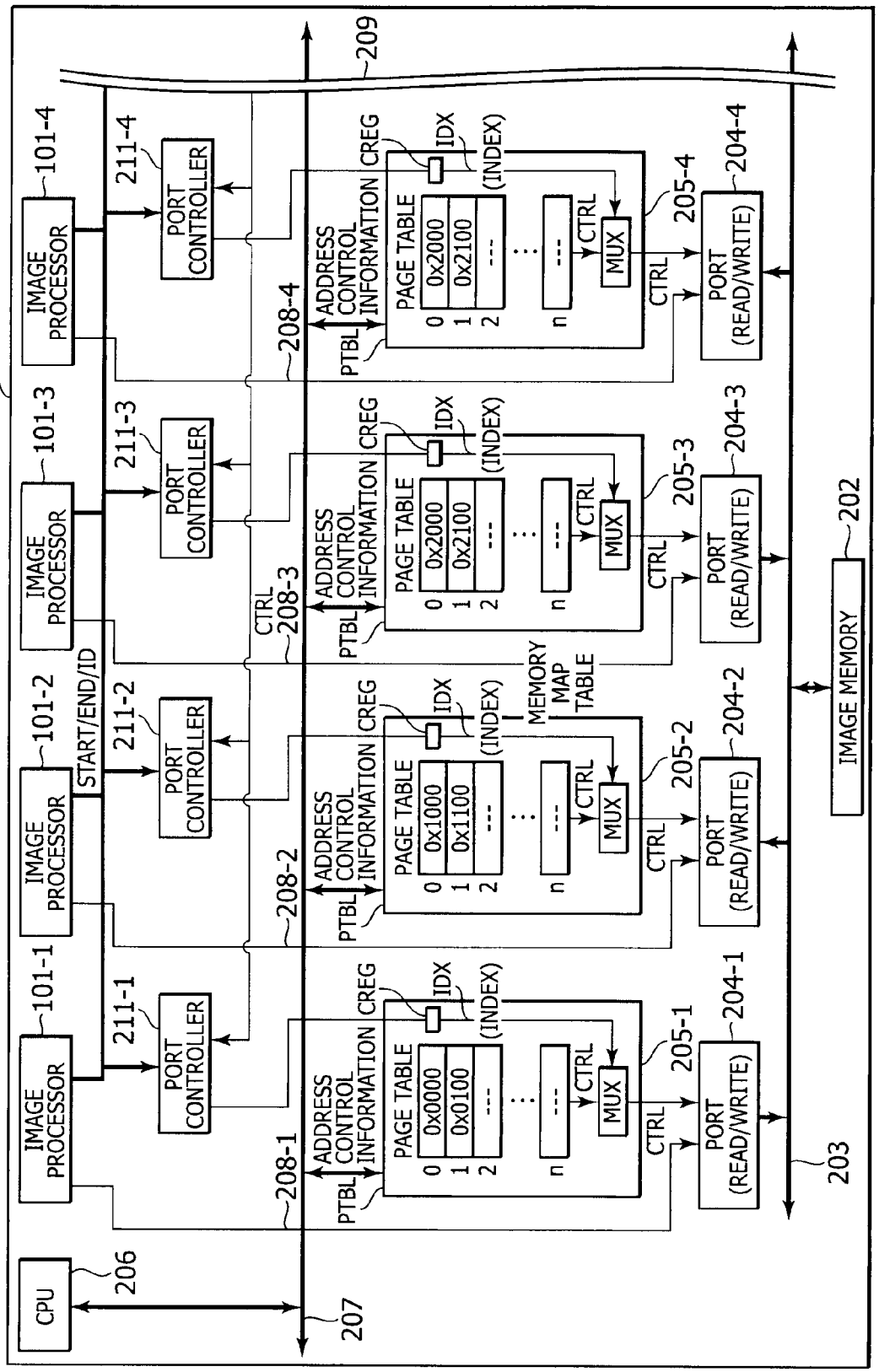
FIG. 10 is a block diagram showing an example of the structure of an image processing apparatus according to a second embodiment of the present invention.

FIG. 10 is a block diagram showing an example of the structure of an image processing apparatus according to the second embodiment of the present invention.

A point different between the image processing apparatus 200A of the second embodiment and the image processing apparatus 200 of the first embodiment resides in that port controllers 211-1 to 211-$m$ (in the example shown in FIG. 10, m=4) are added between the video processors 201-1 to 201-4 and the corresponding memory map table units 205-1 to 205-4.

By adding the port controllers 211-1 to 211-4, virtual frame buffers can be configured on the temporary video memory 202. Further, by managing concentrically the memory map of the temporary video memory by interconnecting the port controllers 211-1 to 211-4, a memory map can be switched at high speed and a memory usage efficiency can be improved.

In the second embodiment, the port controllers 211-1 to 211-4 are provided between the video processors 201-1 to 201-4 and the corresponding memory map table units 205-1 to 205-4. The reason for this is as follows.

In the structure of the image processing apparatus 200 of the first embodiment not having the port controllers, CPU 206 sets arrangement and attribute information on video data and a control signal to the page table PTBL of each memory map table unit 205 (-1 to -4), and the video processor transfers an index signal for selecting the page table to the memory map table unit, and the data and control signal to the port. The port 204 (-1 to -4) received various signals from the video processor 201 (-1 to -4) and memory map table unit 205 (-1 to -4) performs data transfer with the temporary video memory 202 connected to the video bus 203. Also in this structure, when a process for each different image stored in the page table is to be executed, the page table select index signal from the video processor or CPU is switched so that the process can be changed easily.

Recent specifications required for a typical digital still camera include both the improvement on a frame rate, i.e., speeding up of image processing, and simultaneous image processings of a plurality of types. However, in the image processing apparatus such as the image processing apparatus 200 shown in FIG. 3, each video processor 201 (-1 to -4) performs switching of the memory map of the temporary video memory 202 for image processing flows of a plurality of types to control each port. It is therefore necessary to assign each video processor with a change area of the memory map. As image processing flows of a plurality of types are to be handled as many as possible, there is a risk that a memory usage efficiency of the temporary memory is lowered. Further, the video processor 201 (-1 to -4) is required to transfer a switching signal each time the arrangement and attribute information on the video data in the temporary video memory 202 or the control of the port 204 (-1 to -4) is changed. Therefore, processing speed may be lowered. Furthermore, the overall control may become difficult because each video processor 201 (-1 to -4) changes the memory map of the temporary memory 202 and controls the port 204 (-1 to -4).

In the second embodiment, therefore, by adding the port controller 211 (-1 to -4) between each video processor 201 (-1 to -4) and corresponding memory map table unit 205 (-1 to -4), virtual frame buffers can be configured on the temporary video memory. Further, by managing concentrically the memory map of the temporary video memory by interconnecting the port controllers, a memory map can be switched at high speed and a memory usage efficiency can be improved.

Information to be supplied from each video processor 201 (-1 to -4) to each port controller 211 (-1 to -4) includes, in addition to index information, a video data ID, a video data write start/end signal, a video data read start/end signal and the like.

Description will be made on a memory management process using only one port controller.

Figure 11:
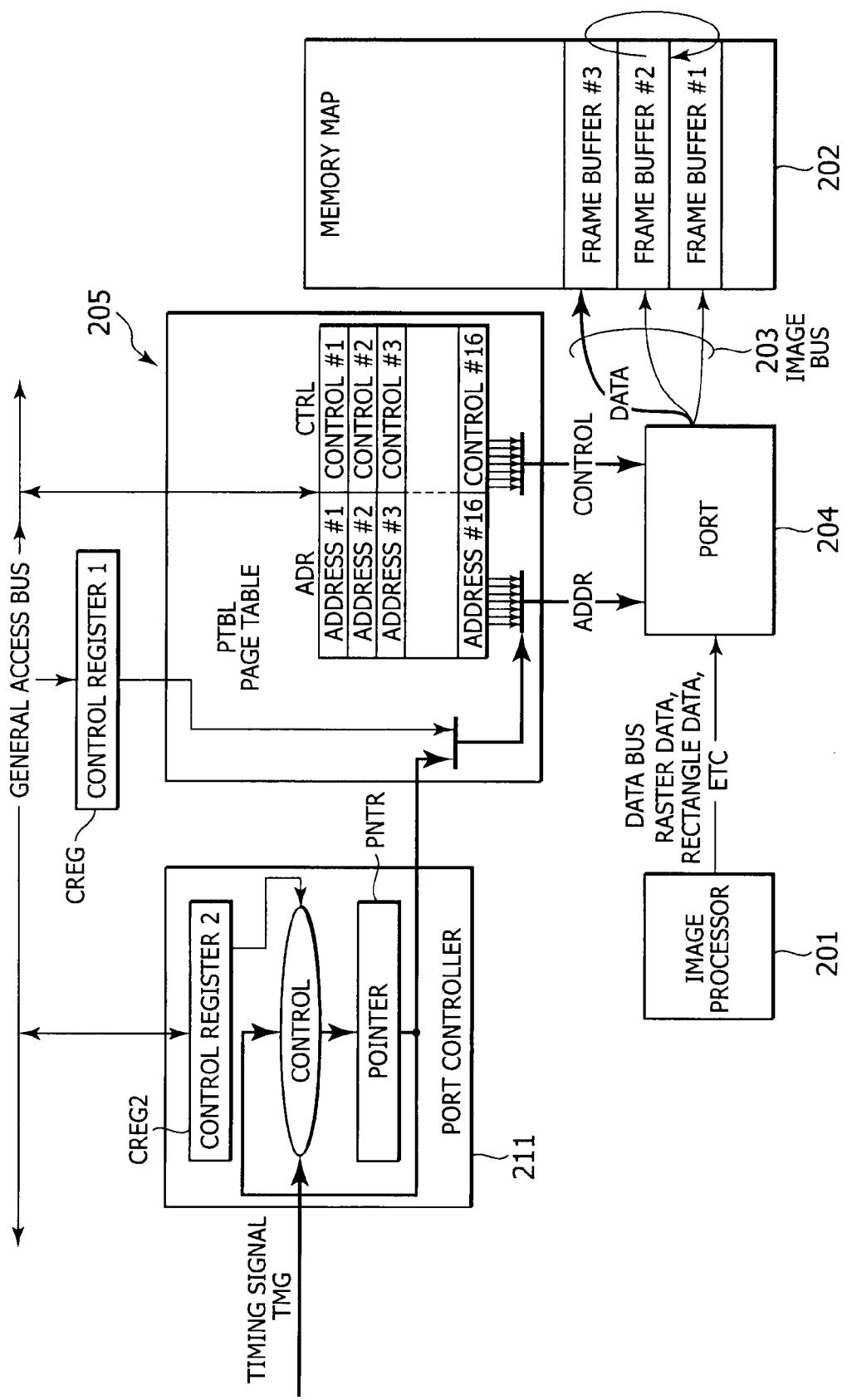
FIG. 11 is a diagram for illustrating a memory management process with one port controller.

FIG. 11 is a diagram illustrating the memory management process using only one port controller.
[With Only One Port Controller]

In this case, the port controller 211 is connected to one page table PTBL.

The port controller 211 functions as a controller which outputs a pointer PNTR for selecting a pair of address information ADR and control information CTRL of the page table PTBL in accordance with a timing signal TMG controlling the system operation and a control register CREG2.

The port controller 211 can change the address information ADR and control information CTRL to be transmitted from the page table PTBL to the port, without involvement of software control. System control by software can therefore be made easily.

A ring buffer in particular can be configured easily on the memory by a plurality of frame buffers. In a system having a plurality of video processors (data processing blocks) and sharing an external memory, a two-stage ring buffer such as a double buffer is required if each video processor (data processing block) is pipelined for operation, and the buffers can be controlled in real time by hardware processing.

Software control is only to set the configuration of frame buffers to the page table PTBL at the initial setting stage of the system operation and to set a command for changing the pointer PNTR of the ring buffer in response to the timing signal TMG to the control register CREGT2 with respect to the port controller 211.

With this structure of the image processing apparatus 200A, CPU 206 sets arrangement information on video data and a control signal to the page table PTBL provided in each memory map table unit 205-1 to 205-4, and the port controller 211-1 to 211-4 transfers an index signal IDX for selecting the page table PTBL to the memory map table unit 205 (-1 to -4).

The port 204 (-1 to -4) received various signals from the video processor 201 (-1 to -4) and memory map table unit 205 (-1 to -4) performs data transfer with the temporary video memory 202 connected to the video bus 203.

Also in this structure, each port controller 211 (-1 to -4) allows the page table PTBL provided in the memory map table unit 205 (-1 to -4) to cooperatively select an index so that the memory map of the temporary video memory 202 can be switched at high speed in accordance with image processing flows and with cooperation of the video processors 201 (-1 to -4). It is therefore possible to improve a memory usage efficiency.

A video memory management apparatus is therefore realized which can realize high speed memory map switching, virtual frame buffers on the temporary video memory, and high speed frame buffer control synchronous with the system operation controller unit.

Figure 12:
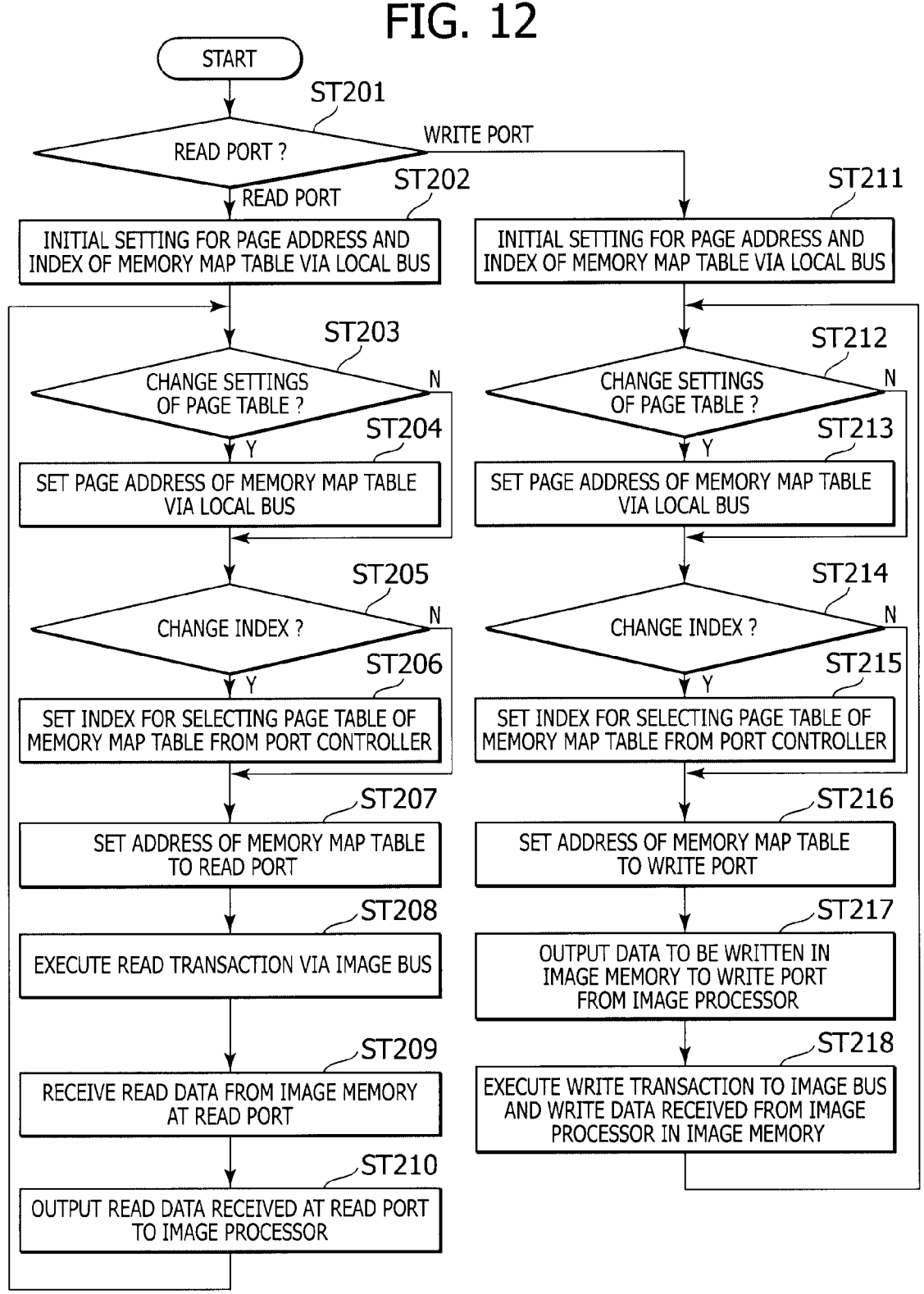
FIG. 12 is a flow chart illustrating the outline of a read/write process of the image processing apparatus shown in FIG. 10.

FIG. 12 is a flow chart illustrating the outline of a read/write process of the image processing apparatus 200A shown in FIG. 10.

Description will now be made on the read/write process of the image processing apparatus 200A shown in FIG. 10, with reference to FIG. 12.

As shown in FIG. 12, CPU 206 judges whether a port is a read port or a write port (ST201), and if it is judged that the port is the read port, a page address and an index of the memory map table unit 205 (-1 to -4) are initialized via the local bus 207 (ST202).

Next, it is judged whether settings of the page table PTBL are required to be changed or not (ST203), and if it is necessary to change, a page address is set to the page table PTBL of the memory map table unit 205 (-1 to -4) via the local bus 207 (ST204) to thereafter advance to the process at Step ST205. If it is judged at Step ST203 that settings of the page table PTBL are not required to be changed, the process at Step ST204 is not performed and the flow advances to the process at Step ST205.

It is judged at Step ST205 whether the index is required to be changed, and if it is necessary to change, the index for selecting the page table PTBL of the memory map table unit 205 (-1 to -4) is set to the control register CREG by the port controller 211 (-1 to -4) (ST206) to thereafter advance to the process at Step ST207. If it is judged at Step ST205 that the index is not required to be changed, the process at Step ST206 is not performed and the flow advances to the process at Step ST207.

At Step ST207, the read address of the video memory 202 selected in accordance with the index in the memory map table unit 205 (-1 to -4) is set to the read port of the corresponding port 204 (-1 to -4).

Next, the read port executes a read transaction via the video bus 203 (ST208).

Data read from the video memory 202 along the read transaction is received at the read port (ST209).

Next, the read data received at the read port is output to the corresponding video processor 201 (-1 to -4) (ST210).

If CPU 206 judges at Step ST201 that a port is not a read port but a write port, a page address and an index of the memory map table unit 205 (-1 to -4) are initialized via the local bus 207 (ST211).

Next, it is judged whether settings of the page table PTBL are required to be changed (ST212), and if it is necessary to change, a page address is set to the page table PTBL of the memory map table unit 205 (-1 to -4) via the local bus 207 (ST213) to thereafter advance to the process at Step ST214. If it is judged at Step ST212 that settings of the page table PTBL are not required to be changed, the process at Step ST213 is not performed and the flow advances to the process at Step ST214.

It is judged at Step ST214 whether the index is required to be changed, and if it is necessary to change, the port controller 211 (-1 to -4) sets the index for selecting the page table PTBL of the memory map table unit 205 (-1 to -4) (ST215) to thereafter advance to the process at Step ST216. If it is judged at Step ST214 that the index is not required to be changed, the process at Step ST215 is not performed and the flow advances to the process at Step ST216.

At Step ST216, the write address of the video memory 202 selected in accordance with the index in the memory map table unit 205 (-1 to -4) is set to the write port of the corresponding port 204 (-1 to -4).

Next, the corresponding video processor 201 (-1 to -4) outputs data which should be written in the video memory 202 to the write port (ST217).

The write port executes a write transaction via the video bus 203 to write the data received from the video processor 201 (-1 to -4) in the video memory 202 (ST218).

Figure 13:
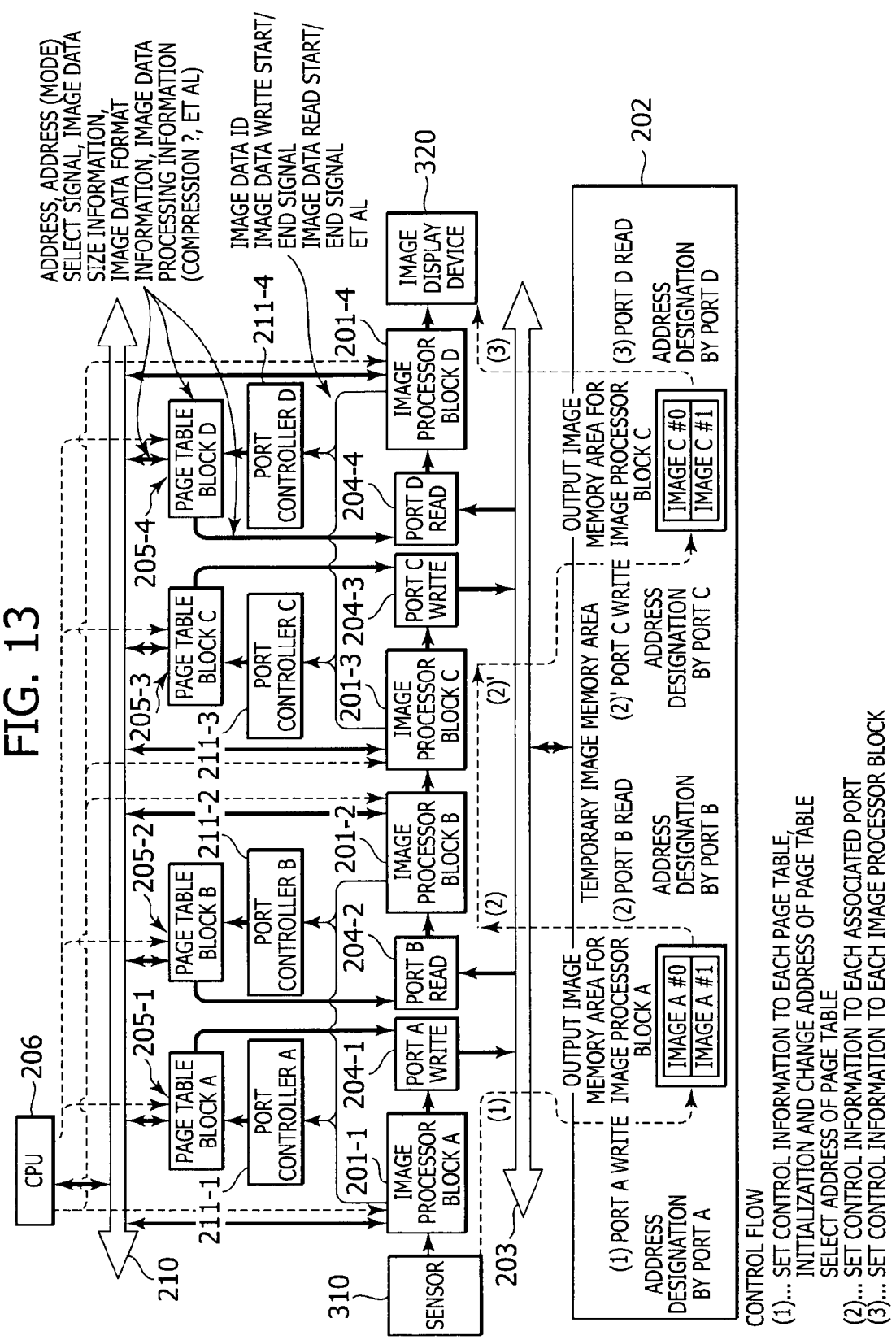
FIG. 13 is a diagram showing the overall flow of address, control information and data in the image processing apparatus of the second embodiment.
Figure 14:
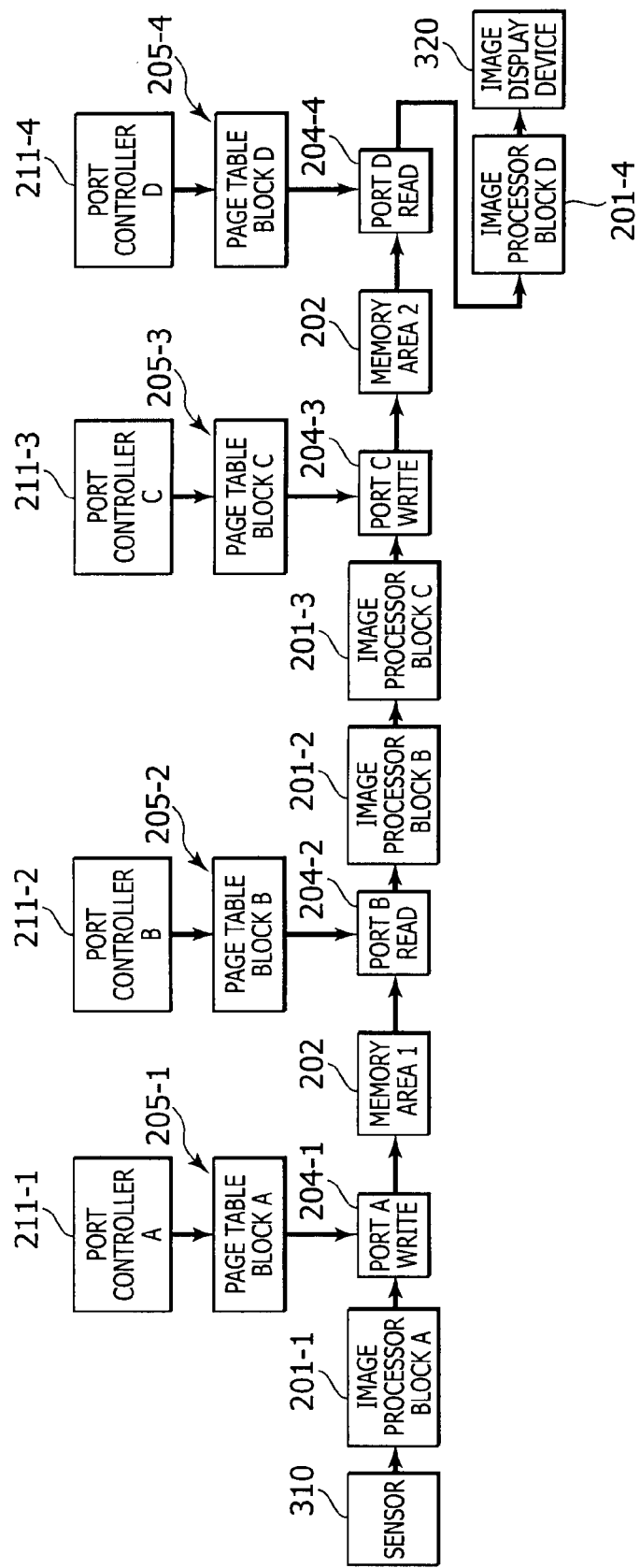
FIG. 14 is a diagram showing data input constituent elements of the image processing apparatus in the second embodiment by time sequence along a data flow.
Figure 15:
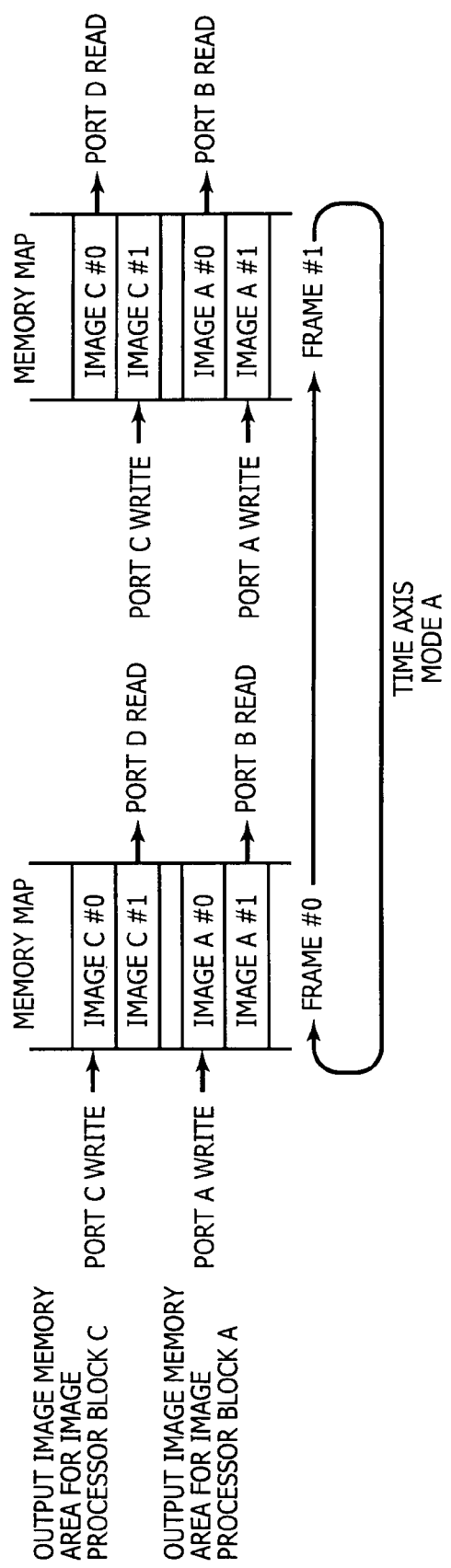
FIG. 15 is a diagram showing an example of a memory area of the second embodiment.

FIGS. 13, 14 and 15 show the overall flow of address, control information and data in the image processing apparatus controlled in the manner described above to perform image processings of different types through repetition of read/write, and an example of a memory map in the memory area of the video memory 202.

FIG. 13 is a diagram showing the overall flow of address, control information and data in the image processing apparatus of the second embodiment. FIG. 14 is a diagram showing data input constituent elements of the image processing apparatus of the second embodiment, time sequentially along a data flow. FIG. 15 is a diagram showing an example of a memory area of the second embodiment.

In this example, video data taken with a sensor 310 formed of a solid state pickup device such as a CCD and a CMOS sensor is displayed on an output device such as a video display device 320.

In FIGS. 13 and 14, the video processor 201-1 shown in FIG. 10 is represented by a video processor block A, the video processor 201-2 is represented by a video processor block B, the video processor 201-3 is represented by a video processor block C, and the video processor 201-4 is represented by a video processor block D.

Similarly, the page table PTBL of the memory map table 205-1 shown in FIG. 10 is represented by a page table block A, the page table PTBL of the memory map table 205-2 is represented by a page table block B, the page table PTBL of the memory map table 205-3 is represented by a page table block C, and the page table PTBL of the memory map table 205-4 is represented by a page table block D.

The port 204-1 shown in FIG. 10 is represented by a port A, the port 204-2 is represented by a port B, the port 204-3 is represented by a port C, and the port 204-4 is represented by a port D.

The port controller 211-1 shown in FIG. 10 is represented by a port controller A, the port controller 211-2 is represented by a port controller B, the port controller 211-3 is represented by a port controller C, and the port controller 211-4 is represented by a port controller D.

In FIG. 13, a control bus 210 includes the local bus 207 and main bus 209 shown in FIG. 10.

In this arrangement, for example, CPU 206 sets an address and control information to each page table PTBL and video processors (blocks) 201-1 to 201-4.

As described with reference to FIG. 12, after it is judged whether the port to be used is a read port or a write port of the port 204-1 to 204-4, the address of the page table PTBL is initialized, changed and so on and the address and control information of the page table PTBL are selected in accordance with the index.

If the index is required to be changed, the port controller 211 (-1 to -4) sets the index for selecting the page table PTBL of the memory map table unit 205 (-1 to -4), to the control register CREG.

The control information is set to the corresponding port 204-1 to 204-4.

The control information is set to the video processors (blocks) 201-1 to 201-4.

The control information includes image size information, image format information, image processing information such as compression and expansion, and other information.

Information to be supplied from each video processor 201 (-1 to -4) to each port controller 211 (-1 to -4) includes, in addition to index information, a video data ID, a video data write start/end signal, a video data read start/end signal and the like. In the example shown in FIGS. 13 to 15, the video processor 201-1 supplies a video data ID and a video data write start/end signal to the port controller 211-1, the video processor 201-2 supplies a video data ID and a video data read start/end signal to the port controller 211-2, the video processor 201-3 supplies a video data ID and a video data write start/end signal to the port controller 211-3, the video processor 201-4 supplies a video data ID and a video data read start/end signal to the port controller 211-4.

In the example shown in FIGS. 13 to 15, the port 204-1 uses the write port, the port 204-2 uses the read port, the port 204-3 uses the write port, and the port 204-4 uses the read port.

Time sequential description will be made on the process to be executed by the image processing apparatus 200A under the control described above. First, video data taken with the sensor 310 and analog-digital converted video data is inputted to the video processor 201-1. The video-processor 201-1 processes (e.g., compresses) video data in accordance with the set control information. The processed video data is recorded in a memory area 1 of the video memory 202 via the video bus 203 in accordance with a write transaction of the write port of the port 204-1.

Next, the compressed video data recorded in the memory area 1 of the video memory 202 is read in accordance with a read transaction of the read port of the port 204-2, and transferred to the video processor 201-2. The video processor 201-2 executes an expansion (development) process or decode process of the read data, and transfers the results to the video processor 201-3.

The video processor 201-3 executes an encode process, e.g., generating a video source through a signal compression process of the video data, and the results are recorded in a memory area 2 of the video memory 202 via the video bus 203 in accordance with a write transaction of the write port of the port 204-3.

Next, the compressed video data recorded in the memory area 2 of the video memory 202 is read in accordance with a read transaction of the read port of the port 204-4, and transferred to the video processor 201-4. The video processor 201-4 processes the read data by an expansion (development) process or decode process and image processing compliant with the display apparatus, and transfers the results to the video display apparatus 320.

As described above, according to the second embodiment, the port controller provided in each port allows the memory map of the temporary video memory to be switched at high speed. Further, a memory usage efficiency of the temporary video memory can be improved for each image processing flow.

Third Embodiment

Figure 16:
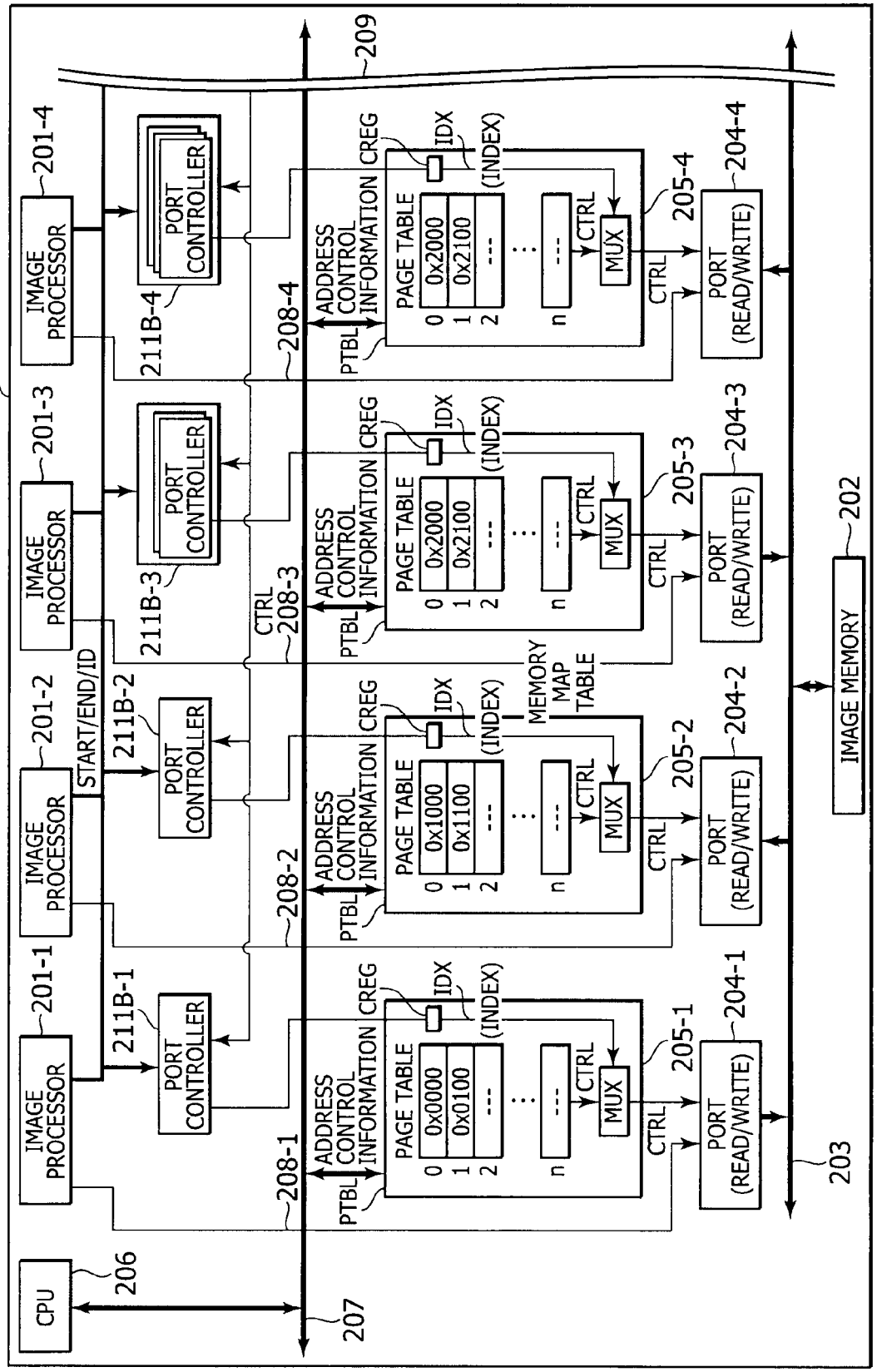
FIG. 16 is a block diagram showing an example of the structure of an image processing apparatus according to a third embodiment of the present invention.

FIG. 16 is a block diagram showing an example of the structure of an image processing apparatus according to the third embodiment of the present invention.

A difference between the image processing apparatus 200B of the third embodiment and the image processing apparatus 200A of the second embodiment resides in that a plurality of port controllers 211B which control index signals for page table selection included in each memory map table 205 (-1 to -4) and corresponds to each port 204 (-1 to -4) are provided.

By providing each port with a plurality of port controllers, each video processor 201 (-1 to -4) can execute a multi-image process, and the memory map of the temporary video memory can be managed easily for image processing flows of a plurality of different types. It is therefore possible to execute easily a process such as a seamless operation which requires a high speed multi-image process.

In the third embodiment, each port is provided with a plurality of port controllers. The reason for this is as follows.

In the structure of the image processing apparatus 200A of the second embodiment having only one port controller for each port, CPU 206 sets arrangement and attribute information on video data and a control signal to the page table PTBL provided in each memory map table unit 205 (-1 to -4), and the port controller 211 (-1 to -4) transfers an index signal for selecting the page table PTBL to the memory map table unit 205 (-1 to -4). The port 204 (-1 to -4) received various signals from the video processor 201 (-1 to -4) and memory map table unit 205 (-1 to -4) performs data transfer with the temporary video memory 202 connected to the video bus. Also in this structure, each port controller 211 (-1 to -4) allows the page table PTBL provided in the memory map table unit 205 (-1 to -4) to cooperatively select an index so that the memory map of the temporary video memory 202 can be switched at high speed in accordance with types of images to be processed and the memory map can be switched cooperatively with each video processor to improve memory usage efficiency.

Recent specifications required for a typical digital still camera include both the improvement on a frame rate, i.e., speeding up of image processing, and image processings of a plurality of types. However, in the image processing apparatus such as the image processing apparatus 200A shown in FIG. 10, the memory map of the temporary video memory is collectively managed by one port controller 211 (-1 to -4) with respect to the port 204 (-1 to -4), video processor 201 (-1 to -4) and memory map table unit 205 (-1 to -4). It is therefore difficult to perform multi-image processing for processing image processing flows of a plurality of types at the same time. If this multi-image processing is to be performed by single-image processing, a processing speed may be lowered considerably and it may difficult to manage the memory map of the temporary video memory.

In the third embodiment, therefore, by providing each port with a plurality of port controllers, each video processor 201 (-1 to -4) can execute multi-image processing, and it is possible to manage easily the memory map of the temporary video memory for image processing flows of a plurality of different types. It is therefore possible to execute easily a process such as a seamless operation which requires a high speed multi-image process.

Description will be made on a memory management process using a plurality of port controllers.

Figure 17:
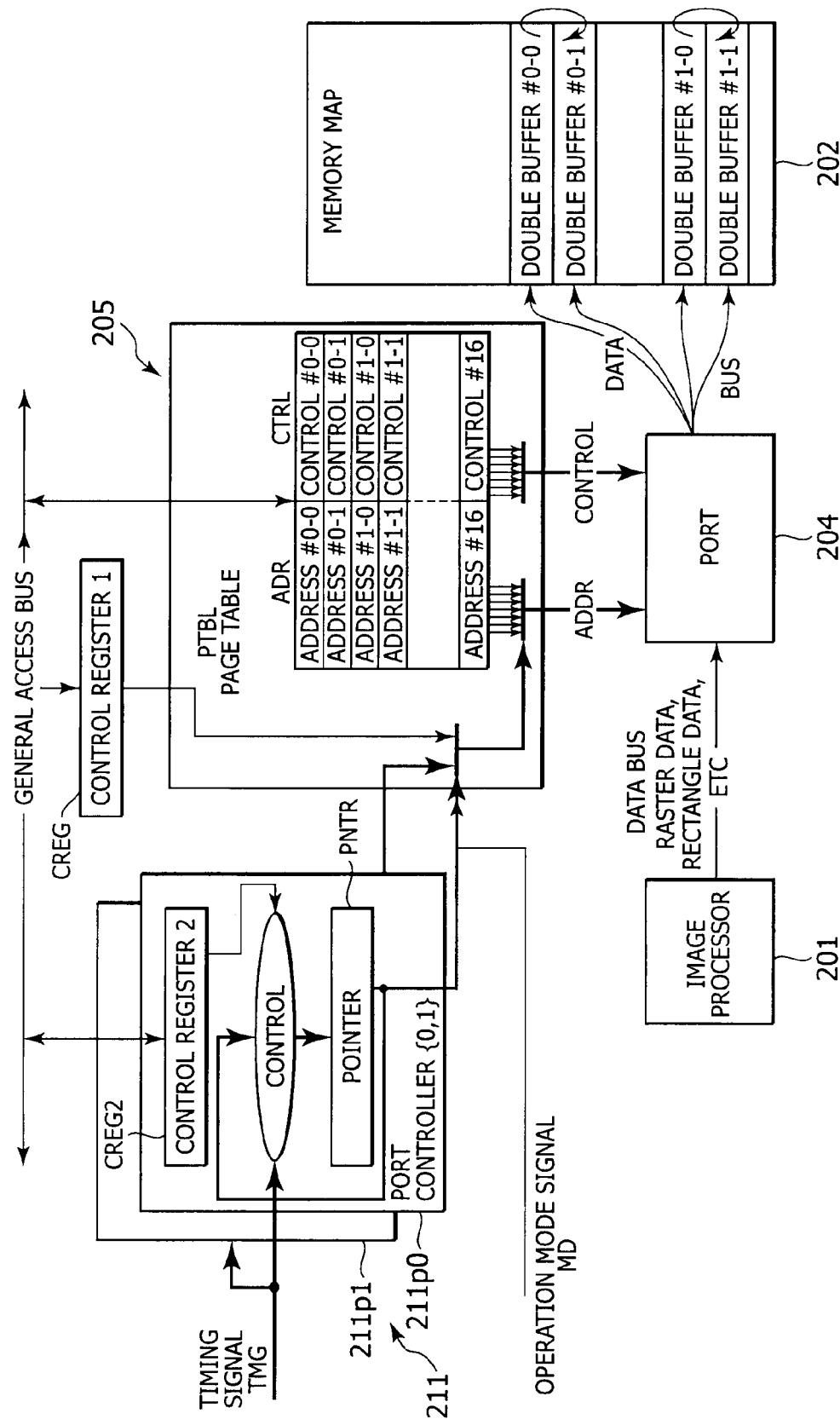
FIG. 17 is a diagram for illustrating a memory management process with a plurality of port controllers.

FIG. 17 is a diagram illustrating the memory management process using a plurality of port controllers.

[With Plural Port Controllers]

As a plurality of port controllers are connected to one page table, as shown in FIG. 17, a plurality of port controllers 211*p* transmit a plurality of pointers PNTR to one page table PTBL. The page table PTBL dynamically selects the pointer PNTR in accordance with an operation mode signal MD representative of a system operation mode, draws page tables, and transmits a pair of address information ADR and control information CTRL to a corresponding port 204 (-1 to -4).

With this arrangement, a plurality of ring buffers can be configured on the memory.

For example, when the video processor (data processing block) processes in parallel both a moving image and a still image time divisionally with respect to camera signal process in a pipeline system, it is necessary to read the moving image and still image time divisionally from two ring buffers configured on the memory to perform image processing. For this processing, there are provided a port controller 211p0 for controlling a moving image ring buffer and a port controller 211p1 for controlling a still image ring buffer so that system control can be made by hardware.

Software control is only to set the configuration of frame buffers to the page table at the initial setting stage of the system operation and to set a command for changing the pointer PNTR of the ring buffer in accordance with the timing signal TMG, to the control register CREG 2.

With this structure of the image processing apparatus 200B, CPU 206 sets arrangement information on video data and a control signal to the page table PTBL provided in each memory map table unit 205 (-1 to -4).

The port controller 211B suitable for the current video processor is selected from a plurality of port controllers 211B (-1 to -4), and the selected port controller 211 transfers an index signal IDX for selecting the page table PTBL to the corresponding memory map table unit 205 (-1 to -4).

The port 204 (-1 to -4) received various signals from the video processor 201 (-1 to -4) and memory map table unit 205 (-1 to -4) performs data transfer with the temporary video memory 202 connected to the video bus 203.

Also in this structure, each port controller 211B (-1 to -4) allows the page table PTBL provided in the memory map table unit 205 (-1 to -4) to cooperatively select an index so that the memory map of the temporary video memory 202 can be switched at high speed in accordance with image processing flows and with cooperation of the video processors 201 (-1 to -4), memory maps can be switched. It is therefore possible to improve a memory usage efficiency.

A video memory management apparatus is therefore realized which can realize high speed memory map switching, virtual frame buffers on the temporary video memory, and high speed frame buffer control synchronous with the system operation controller unit.

By switching and controlling a plurality of port controllers 211B (-1 to -4) provided for each port 204 (-1 to -4), multi-image processing of handling image processing flows of a plurality of types at a time is realized. By managing collectively a plurality of port controllers, an image managing apparatus is realized which can switch at high speed the memory map of the temporary video memory to the memory map corresponding to image processing flows of a plurality of types.

In the third embodiment, a plurality of port controllers are connected to each page table, and whereby an image processing apparatus capable of switching at high speed the system control in synchronization with the system operation control unit is realized.

Figure 18:
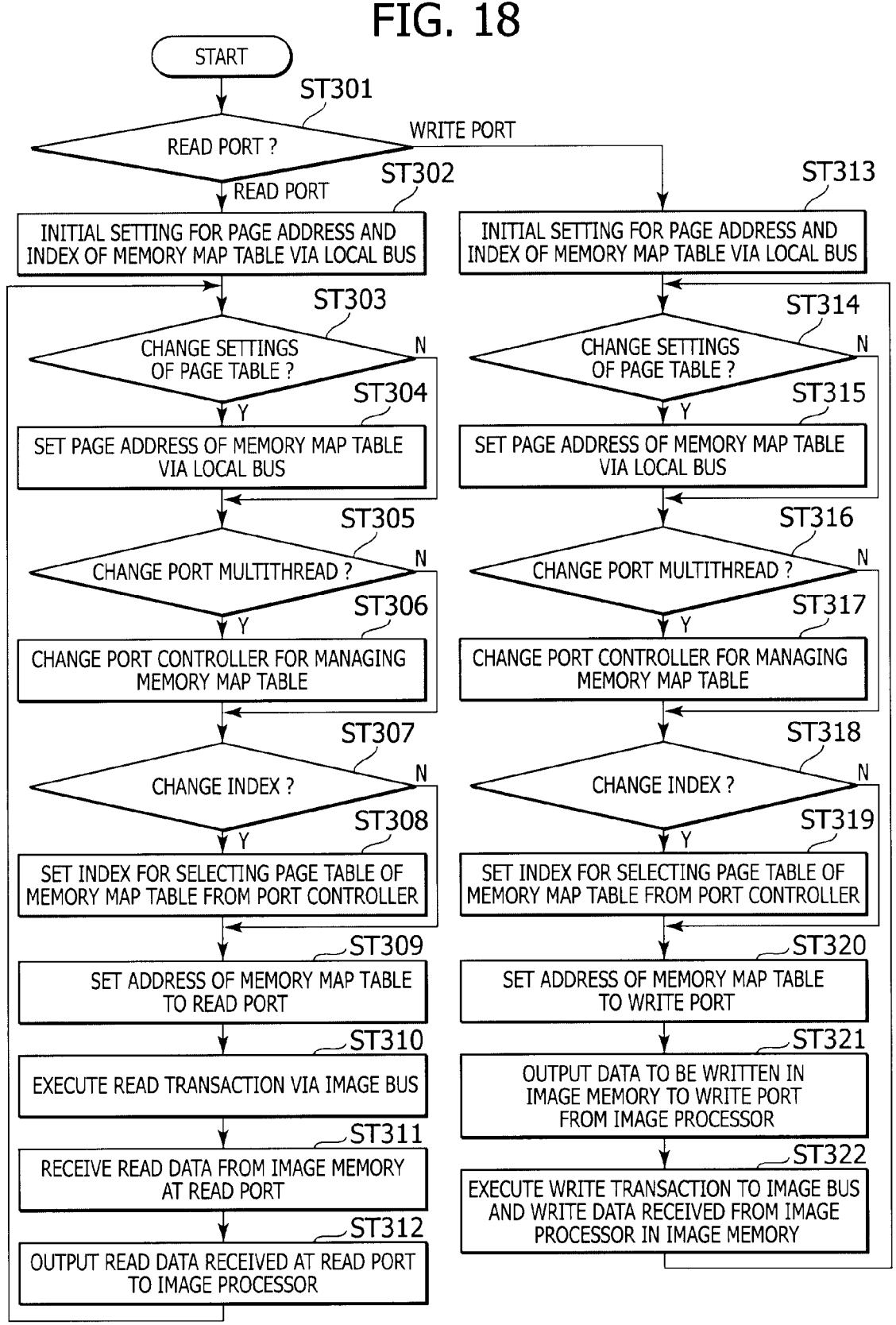
FIG. 18 is a flow chart illustrating the outline of a read/write process of the image processing apparatus 200B shown in FIG. 16.

FIG. 18 is a flow chart illustrating the outline of a read/write process of the image processing apparatus 200B shown in FIG. 16.

Description will now be made on the read/write process of the image processing apparatus 200B shown in FIG. 16, with reference to FIG. 18.

As shown in FIG. 18, CPU 206 judges whether a port is a read port or a write port (ST301), and if it is judged that the port is the read port, a page address and an index of the memory map table unit 205 (-1 to -4) are initialized via the local bus 207 (ST302).

Next, it is judged whether settings of the page table PTBL are required to be changed (ST303), and if it is necessary to change, a page address is set to the page table PTBL of the memory map table unit 205 (-1 to -4) via the local bus 207 (ST304) to thereafter advance to the process at Step ST305. If it is judged at Step ST303 that settings of the page table PTBL are not required to be changed, the process at Step ST304 is not performed and the flow advances to the process at Step ST305.

It is judged at Step S305 whether a port multithread is required to be changed, and if it is necessary to change, the port controller for managing the memory map table unit 205 (-1 to -4) is changed (ST306) to thereafter advance to the process at Step ST307. If it is judged at Step ST305 that the port multithread is not required to be changed, the process at Step ST306 is not performed and process advances to Step ST307.

It is judged at Step ST307 whether the index is required to be changed, and if it is necessary to change, the port controller 211B (-1 to -4) sets an index for selecting the page table PTBL of the memory map table unit 205 (-1 to -4) to the control register CREG (ST308) to thereafter advance to the process at Step ST309. If it is judged at Step ST307 that the index is not required to be changed, the process at Step ST308 is not performed and the flow advances to the process at Step ST309.

At Step ST309, the read address of the video memory 202 selected in accordance with the index in the memory map table unit 205 (-1 to -4) is set to the read port of the corresponding port 204 (-1 to -4).

Next, the read port executes a read transaction via the video bus 203 (ST310).

Data read from the video memory 202 in accordance with the read transaction is received at the read port (ST311).

Next, the read data received at the read port is output to the corresponding video processor 201 (-1 to -4) (ST312).

If CPU 206 judges at Step ST301 that the port is not a read port but a write port, a page address and an index of the memory map table unit 205 (-1 to -4) are initialized via the local bus 207 (ST313).

Next, it is judged whether settings of the page table PTBL are required to be changed (ST314), and if it is necessary to change, a page address is set to the page table PTBL of the memory map table unit 205 (-1 to -4) via the local bus 207 (ST315) to thereafter advance to the process at Step ST316. If it is judged at Step ST314 that settings of the page table PTBL are not required to be changed, the process at Step ST315 is not performed and the flow advances to the process at Step ST316.

It is judged at Step 316 whether the port multithread switching is required, and if it is necessary to change, the port controller for managing the memory map table unit 205 (-1 to -4) is changed (ST317) to thereafter advance to the process at Step ST318. If it is judged at Step ST316 that the port multithread switching is not required, the process at Step ST317 is not performed and the flow advances to the process at Step ST318.

It is judged at Step ST318 whether the index is required to be changed, and if it is necessary to change, the port controller 211B (-1 to -4) sets the index for selecting the page table PTBL of the memory map table unit 205 (-1 to -4) (ST319) to thereafter advance to the process at Step ST320. If it is judged at Step ST318 that the index is not required to be changed, the process at Step ST319 is not performed and the flow advances to the process at Step ST320.

At Step ST320, the write address of the video memory 202 selected in accordance with the index in the memory map table unit 205 (-1 to -4) is set to the write port of the corresponding port 204 (-1 to -4).

Next, the corresponding video processor 201 (-1 to -4) outputs data to be written in the video memory 202 to the write port (ST321).

The write port executes a write transaction via the video bus 203 to write the data received from the video processor 201 (-1 to -4) in the video memory 202 (ST322).

Figure 19:
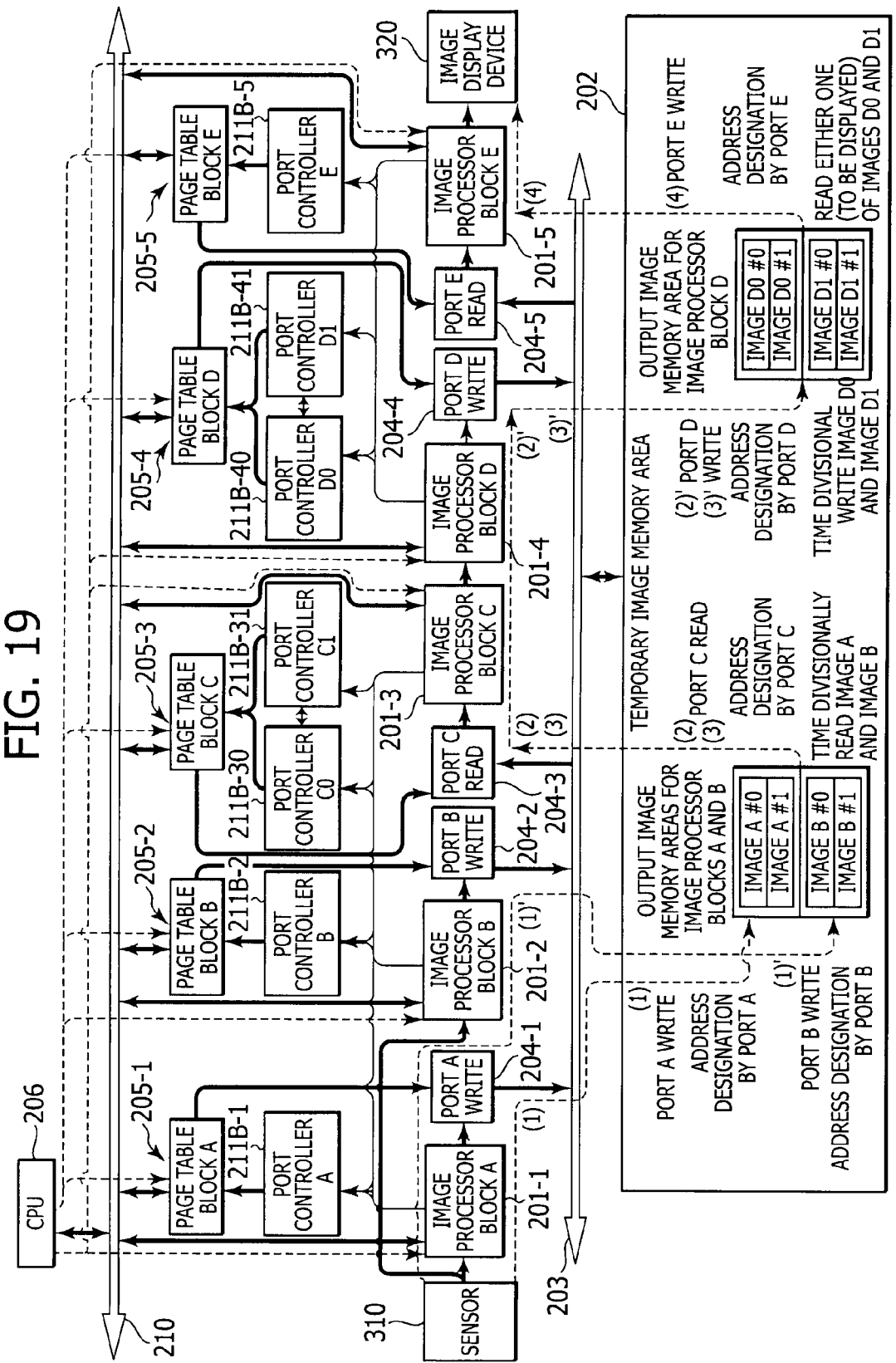
FIG. 19 is a diagram showing the overall flow of address, control information and data in the image processing apparatus of the third embodiment.
Figure 20:
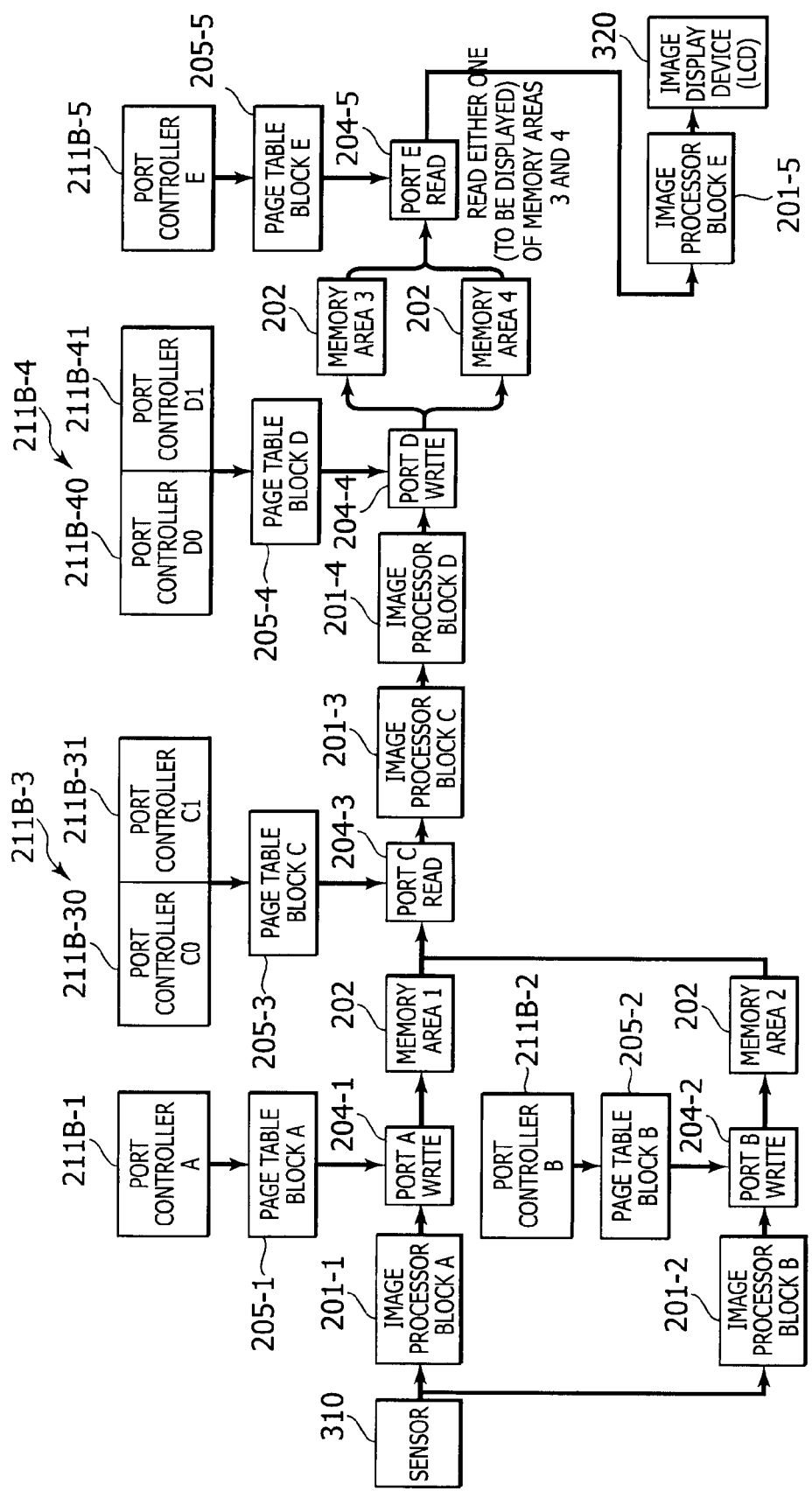
FIG. 20 is a diagram showing data input constituent elements of the image processing apparatus of the third embodiment by time sequence along a data flow.
Figure 21:
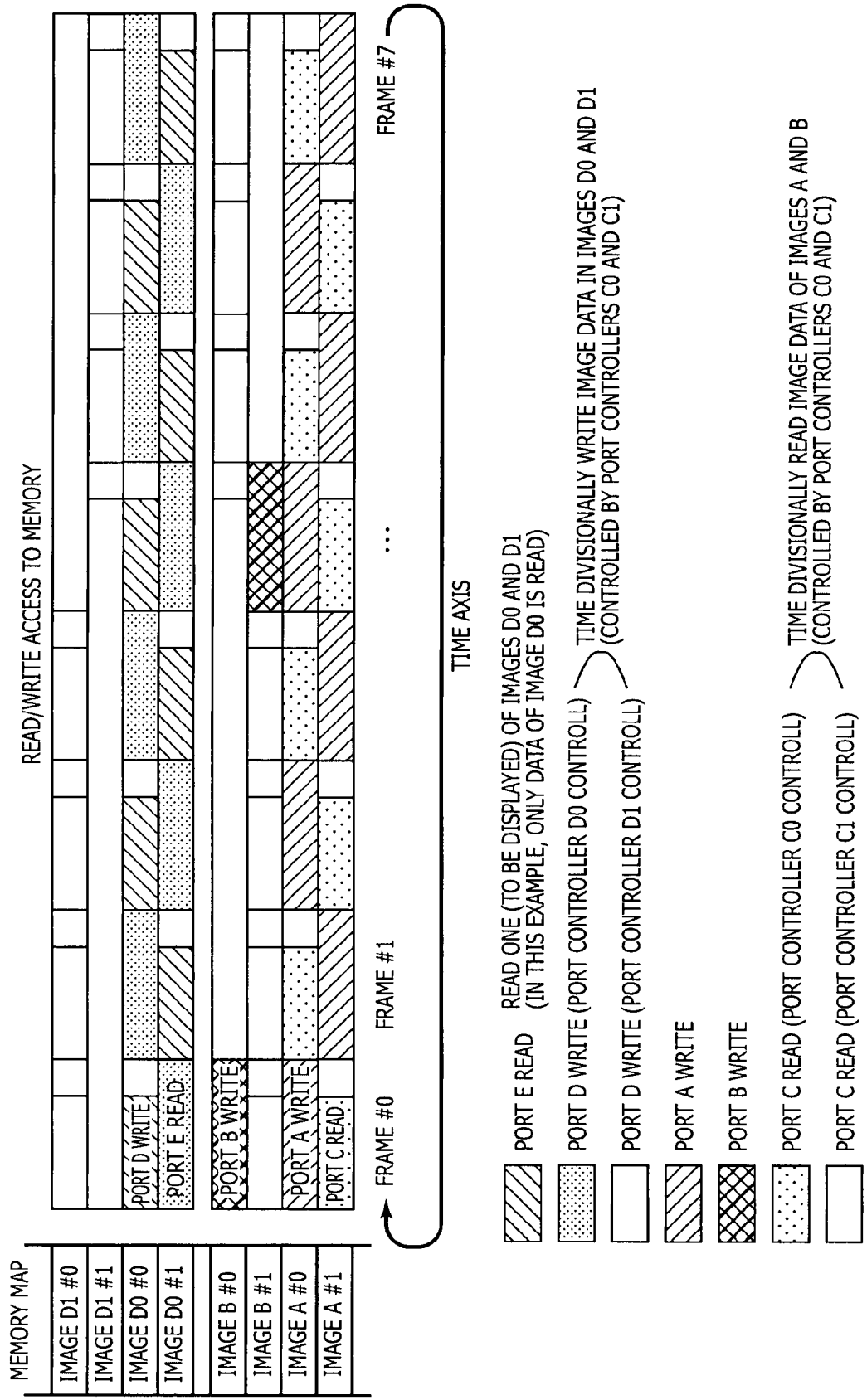
FIG. 21 is a diagram showing an example of a memory area of the third embodiment.

FIGS. 19, 20 and 21 show the overall flow of address, control information and data in the image processing apparatus controlled in the manner described above to perform image processings of different types through repetition of read/write, and an example of a memory map in the memory area of the video memory 202.

FIG. 19 is a diagram showing the overall flow of address, control information and data in the image processing apparatus of the third embodiment. FIG. 20 is a diagram showing data input constituent elements of the image processing apparatus of the third embodiment, time sequentially along a data flow. FIG. 21 is a diagram showing an example of a memory area of the third embodiment.

Also in this example, video data taken with a sensor 310 having a solid state pickup device such as a CCD and a CMOS sensor is displayed on an output device such as a video display device 320.

In this example, m=5 and the image processing apparatus has video processors 201-1 to 201-5, ports 204-1 to 204-5, memory map table units 205-1 to 205-5 and port controllers 211B-1 to 211B-5. The port controllers 211B-3 and 211B-4 each have two port controllers.

In FIGS. 19 and 20, the video processor 201-1 shown in FIG. 16 is represented by a video processor block A, the video processor 201-2 is represented by a video processor block B, the video processor 201-3 is represented by a video processor block C, the video processor 201-4 is represented by a video processor block D, and the video processor 201-5 is represented by a video processor block E.

Similarly, the page table PTBL of the memory map table 205-1 shown in FIG. 16 is represented by a page table block A, the page table PTBL of the memory map table 205-2 is represented by a page table block B, the page table PTBL of the memory map table 205-3 is represented by a page table block C, the page table PTBL of the memory map table 205-4 is represented by a page table block D, and the page table PTBL of the memory map table unit 205-5 is represented by a page table block E.

The port 204-1 shown in FIG. 16 is represented by a port A, the port 204-2 is represented by a port B, the port 204-3 is represented by a port C, the port 204-4 is represented by a port D, and the port 204-5 is represented by a port E.

The port controller 211B-1 shown in FIG. 16 is represented by a port controller A, the port controller 211B-2 is represented by a port controller B0, B1, the port controller 211B-3 is represented by a port controller C0, C1, the port controller 211-B4 is represented by a port controller D, and the port controller 211B-5 is represented by a port controller E.

In FIG. 19, a control bus 210 includes the local bus 207 and main bus 209 shown in FIG. 16.

In this arrangement, for example, CPU 206 sets an address and control information to each page table PTBL and video processors (blocks) 201-1 to 201-5.

As described with reference to FIG. 18, after it is judged whether the port to be used is a read port or a write port of the port 204-1 to 204-5, the address of the page table PTBL is initialized, changed and so on and the address and control information of the page table PTBL are selected in accordance with the index.

If the index is required to be changed, the port controller 211 (-1 to -5) sets the index for selecting the page table PTBL of the memory map table unit 205 (-1 to -5) to the control register CREG.

For the port controllers 211B-2 and 211B-3 each having a plurality of port controllers, port controllers corresponding to the current video processors 201-2 and 201-3 are selected, and the control information is set to the corresponding ports 204-1 to 204-5.

The control information is set to the video processors (blocks) 201-1 to 201-5

The control information includes image size information, image format information, image processing information such as compression and expansion, and other information.

Information to be supplied from each video processor 201 (-1 to -4) to each port controller 211 (-1 to -4) includes, in addition to index information, a video data ID, a video data write start/end signal, a video data read start/end signal and the like. In the example shown in FIGS. 13 to 15, the video processor 201-1 supplies a video data ID and a video data write start/end signal to the port controller 211B-1, the video processor 201-2 supplies a video data ID and a video data read start/end signal to the port controller 211B-2, the video processor 201-3 supplies a video data ID and a video data write start/end signal to the port controller 211-3, the video processor 201-4 supplies a video data ID and a video data read start/end signal to the port controller 211B-4.

In the example shown in FIGS. 19 to 21, in particular in FIG. 20, the port 204-1 uses the write port, the port 204-2 uses the write port, the port 204-3 uses time divisionally the read ports by two port controllers, the port 204-4 uses time divisionally the write ports of two port controllers, and the port 204-5 uses the read port.

Time sequential description will be made on the process to be executed by the image processing apparatus 200B under the control described above. First, video data taken with the sensor 310 converted from analog to digital is input to the video processors 201-1 and 201-2. The video-processor 201-1 processes (e.g., compresses) video data in accordance with the set control information. The processed video data is recorded in a memory area 1 of the video memory 202 via the video bus 203 in accordance with a write transaction of the write port of the port 204-1. The video-processor 201-2 processes (e.g., compresses) video data in accordance with the set control information. The processed video data is recorded in a memory area 2 of the video memory 202 via the video bus 203 in accordance with a write transaction of the write port of the port 204-2.

Next, the compressed video data recorded in the memory areas 1 and 2 of the video memory 202 is time sequentially read upon a read transaction of the read ports of the port 204-3 under the control of port controllers 211B-30 and 211B-31, and transferred to the video processor 201-3. The video processor 201-3 executes an expansion (development) process or decode process of the read data, and transfers the results to the video processor 201-4.

The video processor 201-4 executes an encode process, e.g., generating a video source through a signal compression process of the video data, and registers time sequentially the results in memory areas 3 and 4 of the video memory 202 via the video bus 203 upon a write transaction of the write ports of the port 204-4 under the control of port controllers 211B-40 and 211B-41.

Next, the compressed video data recorded in the memory areas 1 and 2 of the video memory 202 is selectively read for display upon a read transaction of the read port of the port 204-5, and transferred to the video processor 201-5. The video processor 201-5 processes the read data by an expansion (development) process or decode process and image processing compliant with the display apparatus, and transfers the results to the video display apparatus 320.

As described above, according to the third embodiment, a plurality of port controllers are provided in each port. Therefore, each video processor can perform multi-image processing, and the memory map of the temporary video memory can be managed easily for image processing flows of a plurality of different types. It is therefore possible to execute easily a process such as a seamless operation which requires a high speed multi-image process.

Figure 22:
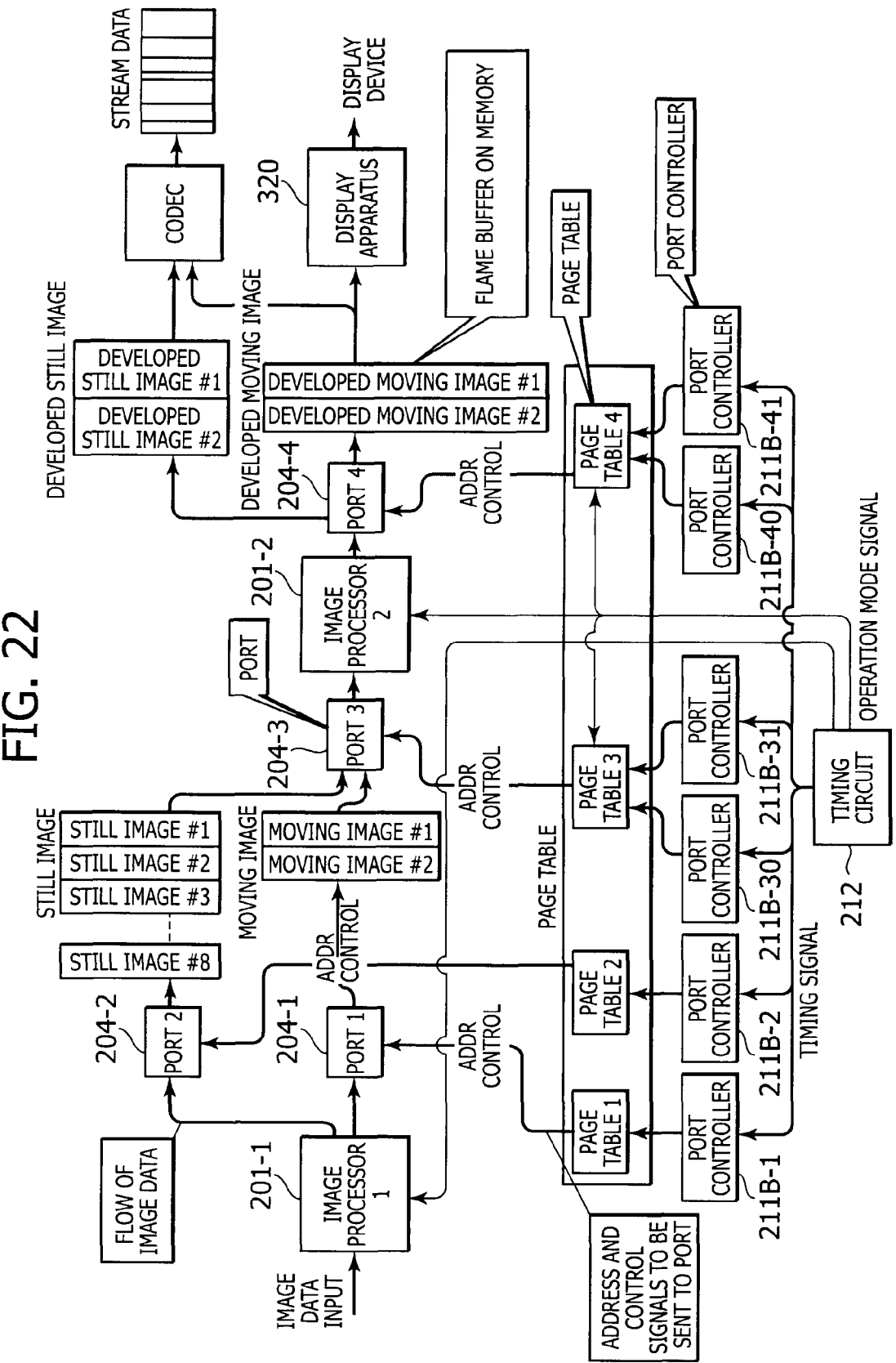
FIG. 22 is a diagram illustrating a preferred application example of the image processing apparatus of the third embodiment.

FIG. 22 is a diagram showing a preferred application example of the image processing apparatus of the third embodiment.

This system configures four ring buffers on the memory, such as still images, moving images, developed still images and developed moving images, so that image processing of moving images and still images can be pipelined and moving images and still images can be processed at the same time.

A video processor 201-1 transfers video data output from an image sensor to a port 204-1 in case of a moving image, and to a port 204-2 if the video data in case of a still image, in accordance with an operation mode signal MD.

In response to a timing signal TMG of a timing circuit 212, a port controller 211B-1 operates to make the port 204-1 obtain a storage address, a size and format information of moving images from a page table PTBL 1 and write the moving images in a moving image double buffer. In this case, a process of writing moving images in the double buffer is automatically controlled by the port controller 211B-1 and page table PTBL 1.

In response to a timing signal TMG of a timing circuit 212, a port controller 211B-2 operates to make the port 204-2 obtain a storage address, a size and format information of still images from a page table PTBL 2 and write the still images data in still image ring buffers.

In this case, a process of writing still images in the ring buffers for consecutive still images is automatically controlled by the port controller 211B-2 and page table PTBL 2.

Moving image data and still image data stored in the memory is subjected to a development process by a video processor 201-2.

In accordance with an operation mode signal, a port 204-3 reads the moving image data portion and still image data portion, and the read portions are developed and thereafter written in a developed moving image double buffer and a developed still image double buffer via a port 204-4. These processes are executed time divisionally to allow moving images and still images to be processed in parallel.

Port controllers 211B-30 and 211B-31 and port controllers 211B-40 and 211B-41 access page tables PTBL 3 and PTBL 4, respectively, and transmit the address information and control information to the ports 204-3 and 204-4. The pipeline and concurrent processing of moving images and still images can therefore be realized.

The page table PTBL 3 stores information on read moving images and still images, and the page table PTBL 4 stores information on the developed images output from the video processor 201-2.

By providing the port controllers and page tables, the system in which high speed operation and concurrent processing is available by pipelined image processing of moving images and still images can be realized by hardware control.

The image processing apparatus of the first to third embodiments having the characteristic structure described above can be applied to a digital camera, a video camera and the like.

Figure 23:
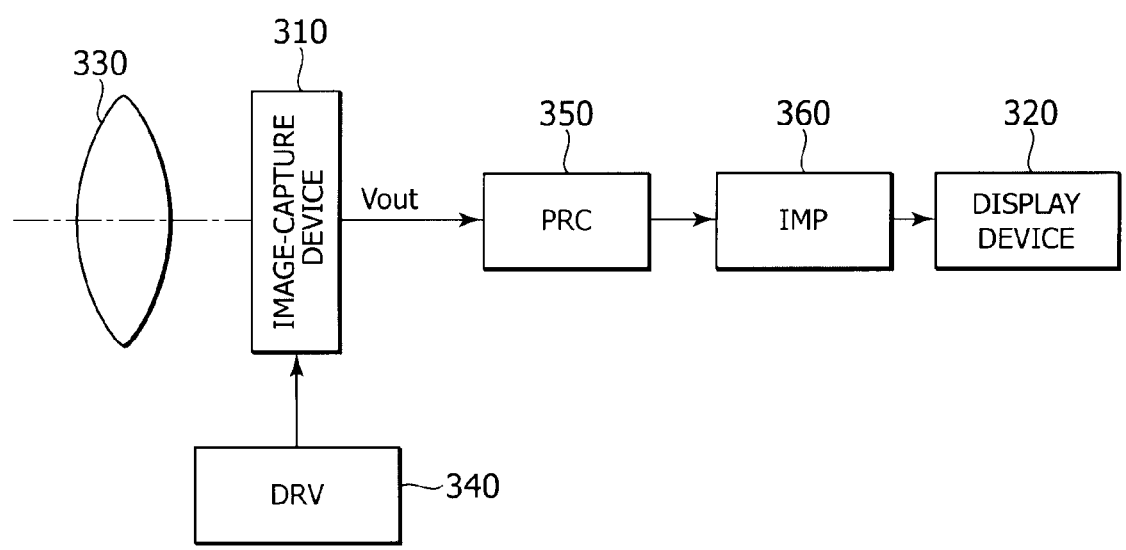
FIG. 23 is a diagram showing an example of the configuration of a camera system to which the image processing apparatus of the embodiment of the present invention is applied.

FIG. 23 is a diagram showing an example of the structure of a camera system to which the image processing apparatus of an embodiment of the present invention is applied.

As shown in FIG. 23, this camera system 300 has an image-capture device 310 as an image sensor, a display device 320, an optical system for guiding incident light to (forming image of an object) a pixel area of the image-capture device 310, e.g., a lens 330 for forming an image on an image-capture plane by incidence light (image light), a driver circuit (DRV) 340 for driving the image-capture device 310, a signal processing circuit (PRC) 350 for processing an output signal from the image-capture device 310, and an image processing apparatus (IMP) 360 for processing a digital signal from the signal processing circuit 350.

The image processing apparatus 200, 200A and 200B described above are adopted in the image processing apparatus 360.

The driver circuit 340 has a timing generator (not shown) for generating various timing signals including a start pulse and a clock pulse for driving vertical CCD, a horizontal CCD and the like, and drives the image-capture device 310 by predetermined timing signals.

The signal processing circuit 350 processes an output signal from the image-capture device 310 by correlated double sampling (CDS), analog/digital (A/D) conversion and the like.

A video signal processed by the signal processing circuit 350 is transferred to the image processing apparatus 360 and stored in a recording medium such as a memory. Video information recorded in the recording medium is hard copied by a printer or the like. The video signal processed by the image processing apparatus 360 is displayed as moving images or still images on the display device 320 formed of a liquid crystal display or the like.

As described so far, a high precision and high speed camera can be realized by mounting the image processing apparatus on an image-capture device, such as a digital still camera.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-115499 filed in the Japanese Patent Office on Apr. 25, 2007, the entire content of which being incorporated herein by reference.

What is claimed is:

1. An image processing apparatus comprising:
a plurality of video processors;
a video memory for recording video data;
a video bus;
a plurality of ports, each connected between one of the video processors and the video memory by way of the video bus, for accessing the video memory in response to supplied information;
a plurality of memory map table units, each connected between one of the video processors and a corresponding one of the ports, and
each including at least one table set with management information for managing a memory area of the video memory in which video data is recorded, and a multiplexer for selectively supplying the management information from the table to a corresponding port in response to an index signal; and a processing unit having a function of setting the management information to the table of the memory map table unit.

2. The image processing apparatus according to claim 1, further comprising:

a plurality of port controllers for controlling a supply of the management information set to the table of a corresponding memory map table unit to each port.

3. The image processing apparatus according to claim 2, wherein, the management information set to each table includes address information and control information to each port, each port controller outputs a pointer selecting a pair of address information and control information of the corresponding table to the memory map table unit in accordance with a timing signal and data set to a register, and each memory map table unit outputs a pair of address information and control information corresponding to the pointer from each port.

4. The image processing apparatus according to claim 2, wherein, a plurality of port controllers are provided, one for each port.

5. The image processing apparatus according to claim 4, wherein, the management information set to each table includes address information and control information to each port, each port controller outputs a plurality of pointers selecting a pair of address information and control information of each table to the memory map table unit in accordance with a timing signal and data set to a register, and each memory map table unit dynamically selects a plurality of pointers from each port by a operation mode signal, and outputs a pair of address information and control information corresponding to the selected pointer.

6. The image processing apparatus according to any one of claims 1 to 5, wherein, the management information set to the table includes arrangement and attribute information of the video data and control information to each port.

7. A camera system comprising:

an image-capture device for taking an image of an object and outputting video data; and an image processing apparatus for performing predetermined processing to the video data, wherein the image processing apparatus comprises a plurality of video processors;

a video memory for recording the video data;

a video bus;

a plurality of ports, each connected between one of the video processors and the video memory by way of the video bus, for accessing the video memory in accordance with supplied information;

a plurality of memory map table units, each connected between one of the video processors and a corresponding one of the ports, and each including at least one table set with management information for managing a memory area of the video memory in which video data is recorded, and a multiplexer for selectively supplying the management information from the table to a corresponding port in response to an index signal; and a processing unit having a function of setting the management information to the table of the memory map table unit.

8. The camera system according to claim 7, further comprising:

a plurality of port controllers for controlling a supply of the management information set to the table of a corresponding memory map table unit to each ports.

9. The camera system according to claim 8, wherein, the management information set to each table includes address information and control information to each port, each port controller outputs a pointer selecting a pair of address information and control information in the corresponding table to the memory map table unit in accordance with a timing signal and data set to a register, and each memory map table unit outputs a pair of address information and control information corresponding to the pointer from each port.

10. The camera system according to claim 9, wherein, a plurality of port controllers are provided, one for each port.

11. The camera system according to claim 10, wherein, the management information set to each table includes address information and control information to each port, each port controller outputs a plurality of pointers selecting a pair of address information and control information in each table to the memory map table unit in accordance with a timing signal and data set to a register, and each memory map table unit dynamically selects a plurality of pointers from each port by an operation mode signal, and outputs a pair of address information and control information corresponding to the selected pointer.

* * * * *